(12) United States Patent
Michaelis et al.

(10) Patent No.: US 12,163,031 B2
(45) Date of Patent: Dec. 10, 2024

(54) PIGMENT PREPARATIONS

(71) Applicant: LANXESS Deutschland GmbH, Cologne (DE)

(72) Inventors: Stephan Michaelis, Garz/Zudar (DE); Sabine Endert, Pulheim (DE); Frank Linke, Cologne (DE); Hans-Ulrich Borst, Elsdorf (DE)

(73) Assignee: LANXESS Deutschland GmbH, Cologne (DE)

( * ) Notice: Subject to any disclaimer, the term of this patent is extended or adjusted under 35 U.S.C. 154(b) by 623 days.

(21) Appl. No.: 17/494,384

(22) Filed: Oct. 5, 2021

(65) Prior Publication Data

US 2022/0106487 A1 Apr. 7, 2022

(30) Foreign Application Priority Data

Oct. 6, 2020 (EP) ..................................... 20200172

(51) Int. Cl.
  *C09B 45/48* (2006.01)
  *C07F 1/08* (2006.01)
  *C07F 15/04* (2006.01)

(52) U.S. Cl.
  CPC .............. *C09B 45/485* (2013.01); *C07F 1/08* (2013.01); *C07F 15/045* (2013.01)

(58) Field of Classification Search
  CPC ........ C07F 1/08; C07F 15/045; C09B 45/485; C09B 67/0002; C09B 67/0029; C09B 67/0082; C09B 67/0092; C09B 67/0096; C09B 67/0041; C09B 62/415; C09B 67/0046; C09B 67/0051; C09B 67/0015; C09B 45/48; C09D 11/037; C09D 11/322; C09D 11/328; D06P 1/10; D06P 1/18; D10B 2331/00

See application file for complete search history.

(56) References Cited

U.S. PATENT DOCUMENTS

| | | | |
|---|---|---|---|
| 7,255,737 B2 | 8/2007 | Feldhues et al. | |
| 8,932,786 B2 | 1/2015 | Borst et al. | |
| 9,663,660 B2 | 5/2017 | Michaelis et al. | |
| 10,005,909 B2 * | 6/2018 | Endert | C09D 5/028 |
| 10,017,644 B2 * | 7/2018 | Endert | G03F 7/028 |
| 10,023,744 B2 | 7/2018 | Linke et al. | |
| 10,059,844 B2 * | 8/2018 | Linke | C09D 11/322 |

FOREIGN PATENT DOCUMENTS

JP 2010111708 A2 5/2010

OTHER PUBLICATIONS

European Search Report from corresponding European Application No. 20200172, dated Mar. 23, 2021, two pages.
W. Herbst, K. Hunger: Industrial Organic Pigments, 3rd edition 2004, p. 390/397.
W. Herbst, K. Hunger, Industrial Organic Pigments (Production, Properties, Applications), 3rd Completely Revised Edition (2004), Wiley-VCH-Verlag, p. 202.

* cited by examiner

*Primary Examiner* — Anthony J Green
(74) *Attorney, Agent, or Firm* — Nicanor A. Kohncke; Christopher L. McDavid; Alyson J. DiLena

(57) ABSTRACT

The novel pigment preparations containing at least one metal azo pigment A) and at least one aliphatic monocarboxylic acid B) having 10 to 22 carbon atoms are suitable for the colouring of plastics and in this connection feature improved heat stability.

17 Claims, No Drawings

PIGMENT PREPARATIONS

The present invention relates to novel pigment preparations based on metal azo pigments and fatty acids, to processes for producing same and to the use of said pigment preparations as yellow pigment for colouring plastics.

Metal complexes formed from azobarbituric acid with nickel salts and the use thereof as yellow pigments have long been known and have been described many times in the literature (cf., for example, W. Herbst, K. Hunger: Industrial Organic Pigments, 3rd edition 2004, p. 390/397). It is additionally known that these products can be reacted further, for example with melamine or melamine derivatives, in order to improve the performance properties of the pigments, for example in the colouring of plastics, lacquers and colour filters for LCDs.

The literature also describes that for adjusting colouristic properties the metal azo pigments can also contain one or more salts of different metals in addition to nickel salts. Application EP-A 1 591 489 discloses metal complexes of azo compounds which contain, as metals, those from the series of the alkali metals, alkaline earth metals, the lanthanides and also aluminium, scandium, titanium, vanadium, chromium, manganese, cobalt, copper, nickel and zinc and optionally iron. The pigments obtained have a different colour locus compared to the pure nickel-azobarbituric acid complexes.

The literature also discloses treating the surface of pigments with additives. This surface coverage is intended for example to improve the dispersion properties of the pigments. However, increasing coverage of the pigment surface is always also associated with a loss of colour strength.

Such a surface treatment of azo pigments is known for example from "W. Herbst, K. Hunger, Industrial Organic Pigments (Production, Properties, Applications), 3rd Completely Revised Edition (2004), Wiley-VCH-Verlag, p. 202".

EP-A 3 072 932 and EP-A 3 222 680 disclose pigments based on metal azobarbituric acid and melamine which contain copper and nickel ions and optionally further metal ions. The pigments known from EP-A 3 072 932 and from EP-A 3 222 680 feature improved dispersion properties.

JP-A 2010111708 discloses treating melamine-containing azobarbituric acid-metal complexes with unsaturated higher fatty acids. The compositions are suitable for example for use in colour filters and for inkjet applications.

The metal azo pigments known from the prior art are still in need of further improvement with regard to the performance features thereof, especially with respect to the heat stability thereof.

It has been found that compositions of metal azo pigments based on azobarbituric acid, nickel salts and copper salts and melamine and/or melamine derivatives and certain fatty acids surprisingly exhibit improved heat stability.

From a performance perspective, heat stability is an important property of pigments. An improvement in this property opens up possibilities for the use of these products in sectors in which high processing temperatures are required, for example in the colouring of plastics such as polypropylene, polyester and polyamide.

The invention therefore relates to pigment preparations, characterized in that they at least contain
i) a metal azo pigment A) containing the components
  a) at least two metal azo compounds of the formula (I) which differ at least in the metal ion Me, or the tautomeric forms thereof,

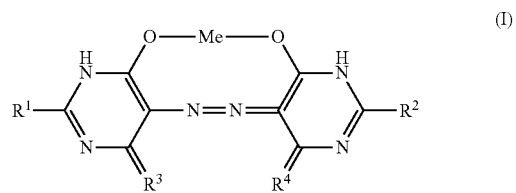

in which $R^1$ and $R^2$ are each independently OH, $NH_2$ or $NHR^5$, $R^3$ and $R^4$ are each independently $=O$ or $=NR^5$, $R^5$ is hydrogen or alkyl, preferably $C_1$-$C_4$-alkyl, and Me is a metal ion $Me^1$ or $Me^2$, wherein $Me^1$ is $Cu^{2+}$ or $Ni^{2+}$ and $Me^2$ is $Zn^{2+}$, $Al^{3+}_{2/3}$, $Fe^{2+}$, $Fe^{3+}_{2/3}$, $Co^{2+}$, $Co^{3+}_{2/3}$, $La^{3+}_{2/3}$, $Ce^{3+}_{2/3}$, $Pr^{3+}_{2/3}$, $Nd^{2+}$, $Nd^{3+}_{2/3}$, $Sm^{2+}$, $Sm^{3+}_{2/3}$, $Eu^{2+}$, $Eu^{3+}_{2/3}$, $Gd^{3+}_{2/3}$, $Tb^{3+}_{2/3}$, $Dy^{3+}_{2/3}$, $Ho^{3+}_{2/3}$, $Yb^{2+}$, $Yb^{3+}_{2/3}$, $Er^{3+}_{2/3}$, $Tm^{3+}_{2/3}$, $Mg^{2+}$, $Ca^{2+}$, $Sr^{2+}$, $Mn^{2+}$, $Y^{3+}_{2/3}$, $Sc^{3+}_{2/3}$, $Ti^{2+}$, $Ti^{3+}_{2/3}$, $Nb^{3+}_{2/3}$, $Mo^{2+}$, $Mo^{3+}_{2/3}$, $V^{2+}$, $V^{3+}_{2/3}$, $Zr^{2+}$, $Zr^{3+}_{2/3}$, $Cd^{2+}$, $Cr^{3+}_{2/3}$, $Pb^{2+}$ or $Ba^{2+}$, with the proviso that the amount of metal ions $Me^1$ in total is 97 to 100 mol % and the amount of metal ions selected from the series $Me^2$ in total is 0 to 3 mol %, based in each case on one mole of all compounds of the formula (I), and wherein the molar ratio of Cu to Ni metal ions in the sum total of the compounds of the formula (I) is 99.9:0.1 to 0.1:99.9, and b) at least one compound of the formula (II)

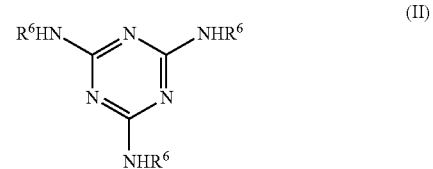

in which $R^6$ is hydrogen or alkyl, preferably $C_1$-$C_4$-alkyl optionally mono- or polysubstituted by OH, or a metal azo pigment A) obtainable by reacting components a) and b), and ii) at least one aliphatic monocarboxylic acid B) having 10 to 22 carbon atoms in an amount of from 70 to 210 g based on 1 mol of all metal azo compounds (I) present in the metal azo pigment A).

In the case that Me in formula (I) is a trivalent metal ion, the charge is balanced by an equivalent amount of anionic structural units of the formula (Ia)

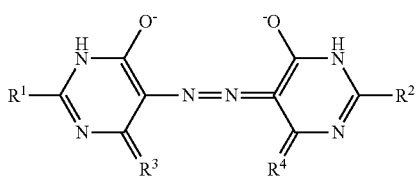

in which $R^1$, $R^2$, $R^3$ and $R^4$ have the definition given for formula (I).

The components a) present in the metal azo pigments A) preferably form adducts together with the components b).

Adducts are understood here to mean molecular assemblies in general. The bonding between the molecules may for example be by intermolecular interactions or Lewis acid-base interactions or by coordinate bonds.

The term "adduct" in the context of the present invention is intended generally to encompass all types of intercalation and addition compounds.

The terms "intercalation compound" or "addition compound" in the context of the present invention shall be understood, for example, to mean compounds which are formed on the basis of intermolecular interactions such as van der Waals interactions or else Lewis acid-base interactions. The manner in which the intercalation proceeds in this case depends not only on the chemical properties of the component to be intercalated but also on the chemical nature of the host lattice. Such compounds are often also referred to as intercalation compounds. In the chemical sense, this is understood to mean the intercalation of molecules, ions (less commonly atoms as well) in chemical compounds.

This is additionally understood to mean inclusion compounds as well, so-called clathrates. These are compounds of two substances, one of which is a guest molecule intercalated into a lattice or cage composed of a host molecule.

The terms "intercalation compound" or "addition compound" in the context of the present invention shall also be understood to mean mixed intercalation crystals (including interstitial compounds). These are chemical, non-stoichiometric, crystalline compounds formed of at least two elements.

In addition, the terms "intercalation compound" or "addition compound" in the context of the present invention shall also be understood to mean compounds which are formed on the basis of coordinate bonds or complex bonds. Such compounds are also referred to, for example, as mixed substitution crystals or mixed replacement crystals in which at least two substances form a common crystal and the atoms of the second component are located at regular lattice sites of the first component.

Compounds suitable for forming an adduct in the sense of the above definition with the compounds of the formula (I) may be either organic or inorganic compounds. These compounds are referred to hereinafter as adduct formers.

Adduct formers suitable in principle come from a very wide variety of compound classes. For purely practical reasons preference is given to such compounds which are liquid or solid under standard conditions (25° C., 1 bar).

Among the liquid substances, preference is generally given to those having a boiling point of 100° C. or more, preferably of greater than or equal to 150° C. at 1 bar. Suitable adduct formers are generally acyclic and cyclic organic compounds, for example aliphatic and aromatic hydrocarbons, which may be substituted, for example, by OH, COOH, $NH_2$, substituted $NH_2$, $CONH_2$, substituted $CONH_2$, $SO_2NH_2$, substituted $SO_2NH_2$, $SO_3H$, halogen, $NO_2$, CN, —$SO_2$-alkyl, —$SO_2$-aryl, —O-alkyl, —O-aryl, —O-acyl.

Carboxamides and sulfonamides are a preferred group of adduct formers, and especially suitable are urea and substituted ureas such as phenylurea, dodecylurea and others, and also the polycondensates thereof with aldehydes, especially formaldehyde; heterocycles such as barbituric acid, benzimidazolone, benzimidazolone-5-sulfonic acid, 2,3-dihydroxyquinoxaline, 2,3-dihydroxyquinoxaline-6-sulfonic acid, carbazole, carbazole-3,6-disulfonic acid, 2-hydroxyquinoline, 2,4-dihydroxyquinoline, caprolactam, melamine, 6-phenyl-1,3,5-triazine-2,4-diamine, 6-methyl-1,3,5-triazine-2,4-diamine, cyanuric acid.

Likewise suitable in principle as adduct formers are polymers, preferably water-soluble polymers, for example ethylene-propylene oxide block polymers, preferably having an $M_n$ of greater than or equal to 1000, especially from 1000 to 10 000 g/mol, polyvinyl alcohol, poly(meth)acrylic acids, modified cellulose, such as carboxymethyl celluloses, hydroxyethyl and -propyl celluloses, methyl and ethyl hydroxyethyl celluloses.

According to the invention, the adduct formers used are those of the formula (II). Particular preference is given here to melamine.

In general, the metal azo pigments A) present in the pigment preparations of the invention contain 0.05 to 4 mol, preferably 0.5 to 2.5 mol and very particularly preferably 1.0 to 2.0 mol of compounds of the formula (II) per mole of compounds (I).

The metal azo pigments A) present in the pigment preparations of the invention may be the physical mixtures of the adducts of a) at least two metal azo compounds of the formula (I) and b) at least one compound of the formula (II). These are preferably the physical mixtures of the adducts of the pure Ni-azo compound with melamine and the pure Cu-azo compound with melamine.

However, the metal azo pigments present in the pigment preparations of the invention are particularly preferably the chemical mixed compounds of the adducts of a) at least two metal azo compounds of the formula (I) and b) at least one compound of the formula (II). These chemical mixed compounds are adducts of those metal azo compounds in which the Ni and Cu atoms, and optionally further metal ions $Me^2$, are incorporated into a common crystal lattice.

The metal azo pigments A) present in the pigment preparations of the invention are preferably those which contain adducts of the components a) at least two metal azo compounds of the above-specified formula (I),
in which $R^1$ and $R^2$ are OH,
$R^3$ and $R^4$ are =O,
$Me^1$ is $Cu^{2+}$ or $Ni^{2+}$
and
$Me^2$ is $Zn^{2+}$, $Al^{3+}_{2/3}$, $Fe^{2+}$, $Fe^{3+}_{2/3}$, $Co^{2+}$, $Co^{3+}_{2/3}$, $La^{3+}_{2/3}$, $Ce^{3+}_{2/3}$, $Pr^{3+}_{2/3}$, $Nd^{2+}$, $Nd^{3+}_{2/3}$, $Sm^{2+}$, $Sm^{3+}_{2/3}$, $Eu^{2+}$, $Eu^{3+}_{2/3}$, $Gd^{3+}_{2/3}$, $Tb^{3+}_{2/3}$, $Dy^{3+}_{2/3}$, $Ho^{3+}_{2/3}$, $Yb^{2+}$, $Yb^{3+}_{2/3}$, $Er^{3+}_{2/3}$, $Tm^{3+}_{2/3}$, $Mg^{2+}$, $Ca^{2+}$, $Sr^{2+}$, $Mn^{2+}$ or $Y^{3+}_{2/3}$, with the proviso that the amount of metal ions $Me^1$ in total is 97 to 100 mol % and the amount of metal ions $Me^2$ in total is 0 to 3 mol %, based in each case on one mole of all compounds of the formula (I), and wherein the molar ratio of Cu to Ni metal ions in the sum total of the compounds of the formula (I) is 0.3:99.7 to 30:70, and
b) at least one compound of the above-specified formula (II)
in which
$R^6$ is hydrogen,
or which are obtainable by reacting components a) and b).

The metal azo pigments A) present in the pigment preparations of the invention are particularly preferably those which contain adducts of the components
a) at least two metal azo compounds of the above-specified formula (I),
in which $R^1$ and $R^2$ are OH,
$R^3$ and $R^4$ are =O,
$Me^1$ is $Cu^{2+}$ or $Ni^{2+}$ and
$Me^2$ is $Zn^{2+}$, $Al^{3+}{}_{2/3}$, $Fe^{2+}$, $Fe^{3+}{}_{2/3}$, $Co^{2+}$, $Co^{3+}{}_{2/3}$, $La^{3+}{}_{2/3}$, $Ce^{3+}{}_{2/3}$, $Pr^{3+}{}_{2/3}$, $Nd^{2+}$, $Nd^{3+}{}_{2/3}$, $Sm^{2+}$, $Sm^{3+}{}_{2/3}$, $Eu^{2+}$, $Eu^{3+}{}_{2/3}$, $Gd^{3+}{}_{2/3}$, $Tb^{3+}{}_{2/3}$, $Dy^{3+}{}_{2/3}$,
with the proviso that the amount of metal ions $Me^1$ in total is 99 to 100 mol % and the amount of metal ions $Me^2$ in total is 0 to 1 mol %, based in each case on one mole of all compounds of the formula (I), and
wherein the molar ratio of Cu to Ni metal ions in the sum total of the compounds of the formula (I) is 0.5:99.5 to 10:90,
and
b) at least one compound of the above-specified formula (II)
in which
$R^6$ is hydrogen,
or which are obtainable by reacting components a) and b).

The metal azo pigments A) present in the pigment preparations of the invention are very particularly preferably those which contain adducts of the components
a) at least two metal azo compounds of the above-specified formula (I),
in which $R^1$ and $R^2$ are OH,
$R^3$ and $R^4$ are =O,
$Me^1$ is $Cu^{2+}$ or $Ni^{2+}$ and
$Me^2$ is $Zn^{2+}$, $Al^{3+}{}_{2/3}$, $Fe^{2+}$, $Fe^{3+}{}_{2/3}$, $Co^{2+}$, $Co^{3+}{}_{2/3}$,
with the proviso that the amount of metal ions $Me^1$ in total is 99 to 100 mol % and the amount of metal ions $Me^2$ in total is 0 to 1 mol %, based in each case on one mole of all compounds of the formula (I), and
wherein the molar ratio of Cu to Ni metal ions in the sum total of the compounds of the formula (I) is 1:99 to 5:95,
and
b) at least one compound of the above-specified formula (II)
in which
$R^6$ is hydrogen,
or which are obtainable by reacting components a) and b).

The metal azo pigments A) present in the pigment preparations of the invention are especially preferably those which contain adducts of the components
a) at least two metal azo compounds of the above-specified formula (I),
in which $R^1$ and $R^2$ are OH,
$R^3$ and $R^4$ are =O and
Me is a metal ion $Me^1$,
with the proviso that the amount of metal ions $Me^1$ in total is 100 mol %, based on one mole of all compounds of the formula (I), and
the molar ratio of Cu to Ni metal ions in the sum total of the compounds of the formula (I) is 1:99 to 5:95, and
b) at least one compound of the above-specified formula (II)
in which
$R^6$ is hydrogen,
or which are obtainable by reacting components a) and b).

The metal azo pigments A) present in the pigment preparations of the invention generally have a BET specific surface area (m$^2$/g) of 50 to 200 m$^2$/g, preferably of 80 to 160 m$^2$/g and very particularly preferably of 100 to 150 m$^2$/g, determined in accordance with DIN 66131 (Determination of the specific surface area of solids by gas adsorption using the method of Brunauer, Emmett and Teller (BET)).

Substituents in the definition of alkyl denote, for example, straight-chain or branched $C_1$-$C_6$-alkyl, preferably $C_1$-$C_4$-alkyl, which may optionally be mono- or polysubstituted identically or differently, for example by halogen such as chlorine, bromine or fluorine; —OH, —CN, —NH$_2$ or $C_1$-$C_6$-alkoxy.

The metal azo pigments A) present in the pigment preparations of the invention are known from EP-A 3 072 932 and EP-A 3 222 680 and can be prepared in a known manner as described in said documents.

By way of example, the metal azo pigments A) are obtainable by reacting the components
a) at least two metal azo compounds of the formula (I) which differ at least in the metal ion Me, or the tautomeric forms thereof,

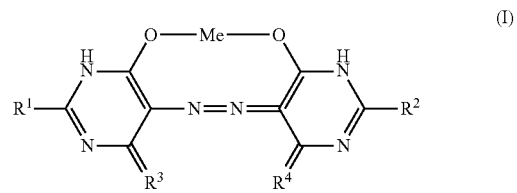

in which
$R^1$ and $R^2$ are each independently OH, NH$_2$ or NHR$^5$,
$R^3$ and $R^4$ are each independently =O or =NR$^5$,
$R^5$ is hydrogen or alkyl, preferably $C_1$-$C_4$-alkyl, and
Me is a metal ion $Me^1$ or $Me^2$,
wherein
$Me^1$ is $Cu^{2+}$ or $Ni^{2+}$ and
$Me^2$ is $Zn^{2+}$, $Al^{3+}{}_{2/3}$, $Fe^{2+}$, $Fe^{3+}{}_{2/3}$, $Co^{2+}$, $Co^{3+}{}_{2/3}$, $La^{3+}{}_{2/3}$, $Ce^{3+}{}_{2/3}$, $Pr^{3+}{}_{2/3}$, $Nd^{2+}$, $Nd^{3+}{}_{2/3}$, $Sm^{2+}$, $Sm^{3+}{}_{2/3}$, $Eu^{2+}$, $Eu^{3+}{}_{2/3}$, $Gd^{3+}{}_{2/3}$, $Tb^{3+}{}_{2/3}$, $Dy^{3+}{}_{2/3}$, $Ho^{3+}{}_{2/3}$, $Yb^{2+}$, $Yb^{3+}{}_{2/3}$, $Er^{3+}{}_{2/3}$, $Tm^{3+}{}_{2/3}$, $Mg^{2+}$, $Ca^{2+}$, $Sr^{2+}$, $Mn^{2+}$, $Y^{3+}{}_{2/3}$, $Sc^{3+}{}_{2/3}$, $Ti^{2+}$, $Ti^{3+}{}_{2/3}$, $Nb^{3+}{}_{2/3}$, $Mo^{2+}$, $Mo^{3+}{}_{2/3}$, $V^{2+}$, $V^{3+}{}_{2/3}$, $Zr^{2+}$, $Zr^{3+}{}_{2/3}$, $Cd^{2+}$, $Cr^{3+}{}_{2/3}$, $Pb^{2+}$ or $Ba^{2+}$,
with the proviso that the amount of metal ions $Me^1$ in total is 97 to 100 mol % and the amount of metal ions selected from the series $Me^2$ in total is 0 to 3 mol %, based in each case on one mole of all compounds of the formula (I),
and
wherein the molar ratio of Cu to Ni metal ions in the sum total of the compounds of the formula (I) is 99.9:0.1 to 0.1:99.9, with the components
b) at least one compound of the formula (II)

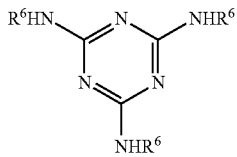

(II)

in which
R⁶ is hydrogen or alkyl, preferably $C_1$-$C_4$-alkyl optionally mono- or polysubstituted by OH.

The metal azo compounds (I) can for example be prepared by reaction of alkali metal salts of the formula (III),

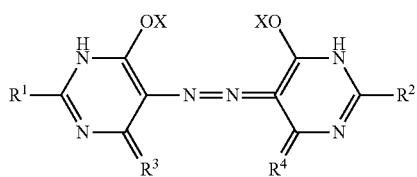

(III)

in which
X is an alkali metal ion, preferably a sodium or potassium ion,
$R^1$ and $R^2$ are each independently OH, $NH_2$ or $NHR^5$,
$R^3$ and $R^4$ are each independently =O or =$NR^5$,
and
$R^5$ is hydrogen or alkyl, preferably $C_1$-$C_4$-alkyl,
or the tautomers thereof, preferably of the sodium or potassium salts,
with nickel and copper salts and optionally one or more $Me^2$ metal salts from the series of $Zn^{2+}$, $Al^{3+}$, $Fe^{2+}$, $Fe^{3+}$, $Co^{2+}$, $Co^{3+}$, $La^{3+}$, $Ce^{3+}$, $Pr^{3+}$, $Nd^{2+}$, $Nd^{3+}$, $Sm^{2+}$, $Sm^{3+}$, $Eu^{2+}$, $Eu^{3+}$, $Gd^{3+}$, $Tb^{3+}$, $Dy^{3+}$, $Ho^{3+}$, $Yb^{2+}$, $Yb^{3+}$, $Er^{3+}$, $Tm^{3+}$, $Mg^{2+}$, $Ca^{2+}$, $Sr^{2+}$, $Mn^{2+}$, $Y^{3+}$, $Sc^{3+}$, $Ti^{2+}$, $Ti^{3+}$, $Nb^{3+}$, $Mo^{2+}$, $Mo^{3+}$, $V^{2+}$, $V^{3+}$, $Zr^{2+}$, $Zr^{3+}$, $Cd^{2+}$, $Cr^{3+}$, $Pb^{2+}$ and $Ba^{2+}$ salts,
wherein 0.001 to 0.999 mol of at least one nickel salt, 0.001 to 0.999 mol of at least one copper salt and 0.03 to 0 mol of at least one metal salt from the series of cited $Me^2$ metal salts are used per mole of compound of the formula (III).

Preferably, 0.7 to 0.997 mol of at least one nickel salt and 0.003 to 0.3 mol of at least one copper salt and 0.03 to 0 mol of at least one metal salt from the series of salts of cited $Me^2$ metal salts are used per mole of compound of the formula (III).

Particularly preferably, 0.9 to 0.995 mol of at least one nickel salt and 0.005 to 0.1 mol of at least one copper salt and 0.03 to 0 mol of at least one metal salt from the series of cited $Me^2$ metal salts are used per mole of compound of the formula (III).

Very particularly preferably, 0.95 to 0.99 mol of at least one nickel salt and 0.01 to 0.05 mol of at least one copper salt and 0.03 to 0 mol of at least one metal salt from the series of salts of cited $Me^2$ metal salts are used per mole of compound of the formula (III).

Especially preferably, 0.95 to 0.99 mol of at least one nickel salt and 0.01 to 0.05 mol of at least one copper salt are used per mole of compound of the formula (III).

In general, 0.05 to 4 mol, preferably 0.5 to 2.5 mol and very particularly preferably 1.0 to 2.0 mol of compound of the formula (II) are used per mole of compound of the formula (I).

The process for preparing the metal azo pigments A) is generally conducted at a temperature of 60 to 95° C. in aqueous solution at a pH below 7. The nickel and copper salts to be used and any further $Me^2$ metal salts to be used can be used individually or as a mixture with one another, preferably in the form of an aqueous solution. The compounds of the formula (II) can likewise be added individually or as a mixture with one another, preferably in the form of solids.

In general, the process for preparing the metal azo pigments A) is conducted in such a way that the azo compound of the formula (III), preferably as the sodium or potassium salt, is initially charged, that one or more of the compound or compounds of the formula (II) that are to be intercalated or added on, preferably melamine, is/are added and then reaction is effected successively or simultaneously with at least one nickel salt and at least one copper salt and optionally one or more $Me^2$ metal salts, preferably in the form of the aqueous solutions of these salts, preferably at pH values less than 7. Suitable substances for adjusting the pH are sodium hydroxide solution, potassium hydroxide solution, sodium carbonate, sodium hydrogencarbonate, potassium carbonate and potassium hydrogencarbonate.

Useful nickel and copper salts preferably include the water-soluble salts thereof, especially chlorides, bromides, acetates, formates, nitrates, sulfates, etc. Nickel and copper salts used with preference have a water solubility of more than 20 g/l, especially more than 50 g/l, at 20° C.

Useful $Me^2$ metal salts preferably include the water-soluble salts thereof, especially the chlorides, bromides, acetates, nitrates and sulfates thereof, preferably the chlorides thereof.

The metal azo pigments A) obtained in this way can then be isolated by filtration of the aqueous suspension thereof as an aqueous filtercake. This filtercake, for example after washing with hot water, can be dried by standard drying methods.

Examples of useful drying methods include paddle drying or spray drying of corresponding aqueous slurries.

The pigment may then be reground.

The metal azo pigments A) present in the pigment preparations of the invention may also be prepared by mixing the adducts of metal azo compounds of the formula (I) in which Me is $Ni^{2+}$ with adducts of metal azo compounds of the formula (I) in which Me is $Cu^{2+}$, and optionally with one or more adducts of metal azo compounds of the formula (I) in which Me is a metal ion $Me^2$.

The aliphatic monocarboxylic acids B) present in the pigment preparations of the invention may be saturated or mono- or polyunsaturated.

The aliphatic monocarboxylic acids B) present in the pigment preparations of the invention are preferably those which contain 10 to 22 carbon atoms and which are saturated or mono- to triunsaturated.

The aliphatic monocarboxylic acids B) present in the pigment preparations of the invention are particularly preferably those which contain 12 to 22 carbon atoms and which are saturated or mono- or diunsaturated.

Examples of such monocarboxylic acids B) for use according to the invention are:
n-decanoic acid (capric acid, $C_{10}H_{20}O_2$),
undec-10-enoic acid (undecylenic acid, $C_{11}H_{20}O_2$),
dodecanoic acid (lauric acid, $C_{12}H_{24}O_2$), tetradecanoic acid (myristic acid, $C_{14}H_{28}O_2$),
hexadecanoic acid (palmitic acid, $C_{16}H_{32}O_2$),
octadecanoic acid (stearic acid, $C_{18}H_{36}O_2$) and
(9Z)-octadec-9-enoic acid (oleic acid, $C_{18}H_{34}O_2$) and
n-docosanoic acid (behenic acid, $C_{22}H_{44}O_2$).

The aliphatic monocarboxylic acids B) present in the pigment preparations of the invention are very particularly preferably those which contain 14 to 18 carbon atoms and which are saturated or monounsaturated.

The aliphatic monocarboxylic acids B) present in the pigment preparations of the invention are especially tetradecanoic acid (myristic acid), hexadecanoic acid (palmitic acid), octadecanoic acid (stearic acid) and (9Z)-octadec-9-enoic acid (oleic acid).

The aliphatic monocarboxylic acids B) may for example be obtained from the company Uniqema (ICI) either in pure form or as a carboxylic acid mixture.

The aliphatic monocarboxylic acids B) present in the pigment preparations of the invention may be in pure form or in the form of mixtures.

The mixtures of aliphatic monocarboxylic acids B) present in the pigment preparations of the invention are preferably mixtures containing at least one saturated or monounsaturated aliphatic monocarboxylic acid having 14 carbon atoms, at least one saturated or monounsaturated aliphatic monocarboxylic acid having 16 carbon atoms and at least one saturated or monounsaturated aliphatic monocarboxylic acid having 18 carbon atoms.

The mixtures of aliphatic monocarboxylic acids B) for use according to the invention preferably contain 0.5% to 5% by weight, preferably 1% to 3% by weight, of at least one saturated or monounsaturated aliphatic monocarboxylic acid having 14 carbon atoms, 25% to 60% by weight, preferably 30% to 50% by weight, of at least one saturated or monounsaturated aliphatic monocarboxylic acid having 16 carbon atoms and 40% to 75% by weight, preferably 45% to 65% by weight, of at least one saturated or monounsaturated aliphatic monocarboxylic acid having 18 carbon atoms.

The mixtures of aliphatic monocarboxylic acids B) present in the pigment preparations of the invention are particularly preferably mixtures containing myristic acid, palmitic acid and stearic acid in the amount ranges specified above.

Such mixtures are known as commercial products of the company UNIQEMA under the trade name "Pristerene®", the different chemical and quantitative compositions of these mixtures being characterized by a four-digit numerical code. Preference according to the invention is given to Pristerene® 4910, containing a mixture of 2% by weight of myristic acid, 30% by weight of palmitic acid and 64% by weight of stearic acid, Pristerene® 4911, containing a mixture of 2% by weight of myristic acid, 45% by weight of palmitic acid and 52% by weight of stearic acid, Pristerene® 4922, containing a mixture of 0.7% by weight of myristic acid, 30% by weight of palmitic acid and 66% by weight of stearic acid and Pristerene® 9429.

The pigment preparations of the invention generally contain 70 to 210 g of at least one aliphatic monocarboxylic acid B) based on 1 mol of all metal azo compounds (I) present in the metal azo pigment A).

The pigment preparations of the invention preferably contain 100 to 180 g, particularly preferably 120 to 160 g, of at least one aliphatic monocarboxylic acid B), based in each case on 1 mol of all metal azo compounds (I) present in the metal azo pigment A).

The pigment preparations of the invention can be produced by mixing at least one metal azo pigment A) with at least one aliphatic monocarboxylic acid B).

The mixing can be effected by mechanical means, for example and preferably by stirring using suitable stirring devices, such as low-speed stirrers (for example paddle stirrers, beam stirrers, planetary stirrers or gyratory mixers) or high-speed stirrers (for example propeller stirrers, turbine stirrers, disc stirrers or impeller stirrers). It is also possible to perform the mixing by hydraulic means in that the reactor content is permanently circulated for example using a centrifugal pump.

The metal azo pigment A) is in this case typically mixed in the form of an aqueous suspension with at least one aliphatic monocarboxylic acid B). To prepare the aqueous suspension, at least one dried and optionally ground metal azo pigment A) is mixed with as much water as is needed to produce a complete suspension of the metal azo pigment.

However, the metal azo pigment A) can also preferably be used directly in the form of the aqueous reaction mixture as obtained during the synthesis of the metal azo pigment A).

To produce the pigment preparation of the invention, at least one aliphatic monocarboxylic acid B) is added to an aqueous pigment suspension containing at least one metal azo pigment A) with stirring, preferably at a temperature in the range from 60 to 95° C., preferably within a period of 10 to 60 minutes, and the mixture thus produced is preferably stirred for 60 to 240 minutes. The pH of the mixture is then adjusted to a value of between 3 and 7 and the pigment preparation is isolated over a suction filter or filter press.

The pigment preparation can be dried by standard drying methods.

Examples of useful drying methods include paddle drying or spray drying of corresponding aqueous slurries.

The pigment preparation may then be ground again.

The pigment preparations of the invention can contain one or more auxiliaries and/or additives.

Useful auxiliaries or additives generally include all auxiliaries and additives that are customary for pigment preparations, for example those from the group of surface-active agents such as dispersants, surfactants, wetting agents, emulsifiers, and bases and acids.

The present invention further provides a process for producing the pigment preparations of the invention which is characterized in that at least one metal azo pigment A) is mixed with at least one aliphatic monocarboxylic acid B) and optionally one or more auxiliaries and/or additives.

In general, the mixing ratio of aliphatic monocarboxylic acid B) to pigment A) in the pigment preparations of the invention is 70 to 210 g, preferably 100 to 180 g and particularly preferably 120 to 160 g, based in each case on one mole of all metal azo compounds (I) present in the metal azo pigment.

The pigment preparations of the invention surprisingly feature particularly good heat stability and furthermore also possess very good dispersibility and additionally feature a high colour strength. Chroma and transparency are exceptionally adjustable.

Unless otherwise stated, all values given in respect of heat stability are based on the measurement method according to European standard DIN EN 12877-2.

The pigment preparations of the invention are exceptionally suitable for all pigment end uses.

The pigment preparations of the invention are especially suitable for the bulk colouring of synthetic, semisynthetic or natural macromolecular substances, especially polyvinyl chloride, polystyrene, polyamide, polyethylene or polypropylene, and for the spin dyeing of natural, regenerated or synthetic fibres, such as for example cellulose, polyester, polycarbonate, polyacrylonitrile or polyamide fibres, and for the printing of textiles and paper.

The examples which follow are intended to illustrate the present invention but without restricting it thereto.

EXAMPLES

I. Preparation of the Metal Azobarbituric Acid-Melamine Pigments A to U According to the Prior Art Example 1: Nickel Azobarbituric Acid-Melamine Pigment According to EP-A 26 82 435, Example 2 (Pigment A)

a) Preparation of the Crude Pigment 154.1 g (1.0 mol) of diazobarbituric acid and 128.1 g (1.0 mol) of barbituric acid were introduced into 3670 g of distilled water at 85° C. Subsequently, aqueous potassium hydroxide solution was used to establish a pH of 5 and the reaction mixture was then stirred for 90 minutes.

5000 g of distilled water were added at 82° C. to the azobarbituric acid (1.0 mol) thus prepared.

33 g of 30% hydrochloric acid were then added dropwise to establish a pH of 2 to 2.5. 264.8 g (2.1 mol) of melamine were then added. 1.0 mol of nickel chloride in the form of an approximately 25% solution were subsequently added dropwise. After 3 hours at 82° C., potassium hydroxide was added to establish a pH of about 5.5.

b) Aftertreatment

This was followed by dilution at 90° C. with about 330 g of distilled water. 70 g of 30% hydrochloric acid were then added dropwise and the reaction mixture was stirred for 12 hours at 90° C. Aqueous potassium hydroxide solution was then used to establish a pH of the reaction mixture of about 5.

c) Workup

Subsequently, the pigment was isolated on a suction filter, washed and dried at 80° C. in a vacuum drying cabinet, and ground for approx. 2 minutes in a standard laboratory mill. (Pigment A)

Examples 2 to 21: Metal Azobarbituric Acid-Melamine Pigments B to U

The pigments B to U of Examples 2 to 21 listed in Table 1 below were prepared analogously to Example 1, except that the 1.0 mol of nickel chloride was replaced in each case by mixtures of nickel chloride and copper(II) chloride and optionally an Me² metal chloride in the molar amounts indicated in Table 1.

Determination of the Dispersion Hardness

For pigments A to U, the dispersion hardness was determined as described in Method 1 given below. The values can be found in Table 1.

Determination of the Heat Resistance

For pigments A to U, the heat resistance was determined as described in Method 2 given below. The values can be found in Table 1.

TABLE 1

Pigments A to U

| Example | Pigment | Ni [mol %] | Cu [mol %] | Me [mol %] | Dispersion hardness | Heat resistance at 300° C. (DE) |
|---|---|---|---|---|---|---|
| 1 | A | 100 | 0 | 0 | 100 | 5.1 |
| 2 | B | 99.95 | 0.05 | 0 | 101 | 5.0 |
| 3 | C | 99.9 | 0.1 | 0 | 103 | 5.2 |
| 4 | D | 99.7 | 0.3 | 0 | 102 | 4.9 |
| 5 | E | 99.5 | 0.5 | 0 | 103 | 5.2 |
| 6 | F | 99.0 | 1.0 | 0 | 103 | 5.1 |
| 7 | G | 98 | 2 | 0 | 99 | 5.3 |
| 8 | H | 97 | 3 | 0 | 101 | 5.3 |
| 9 | I | 95 | 5 | 0 | 34 | 5.5 |
| 10 | J | 85 | 15 | 0 | 38 | 4.9 |
| 11 | K | 70 | 30 | 0 | 50 | 5.3 |
| 12 | L | 50 | 50 | 0 | 62 | 5.2 |
| 13 | M | 25 | 75 | 0 | 70 | 5.5 |
| 14 | N | 5 | 95 | 0 | 72 | 4.9 |
| 15 | O | 2 | 98 | 0 | 76 | 5.3 |
| 16 | P | 1 | 99 | 0 | 76 | 5.2 |
| 17 | Q | 0.5 | 99.5 | 0 | 75 | 4.9 |
| 18 | R | 0.1 | 99.9 | 0 | 82 | 5.0 |
| 19 | S | 0.05 | 99.95 | 0 | 82 | 5.1 |
| 20 | T | 97 | 2 | 1 Zn | 89 | 5.1 |
| 21 | U | 82 | 15 | 3 Co | 53 | 5.2 |

II. Production of the Pigment Preparations

Example 22: Production of Pigment Preparation A-1 (Not in Accordance with the Invention)

100 g of Pristerene 4910 were added to an aqueous suspension of pigment A as obtained after step b) of Example 1 and the mixture was stirred for 60 minutes. Aqueous potassium hydroxide solution was subsequently used to establish a pH of 5. Thereafter, the pigment preparation was isolated on a suction filter, washed and dried at 80° C. in a vacuum drying cabinet, and ground for approx. 2 minutes in a standard laboratory mill. (=pigment preparation A-1)

Examples 23 to 38: Production of Pigment Preparations A-2 to A-17 (Not in Accordance with the Invention)

Analogously to Example 22, pigment preparations A-2 to A-17, not in accordance with the invention, were produced in Examples 23 to 38. Here, different aliphatic carboxylic acids B) or mixtures thereof in different amounts, as indicated in Table 2, were in each case added to an aqueous suspension of pigment A as obtained after step b) of Example 1.

Determination of the Dispersion Hardness and the Heat Resistance

For the pigment preparations A-1 to A-17, the dispersion hardness and the heat resistance were respectively determined in accordance with Methods 1 and 2 given below. The values can likewise be found in Table 2.

TABLE 2

Pigment preparations with pigment A

| Example | Pigment preparation | According to the invention | Grams of aliphatic carboxylic acid B) or mixture per mole of pigment | Aliphatic carboxylic acid B) or mixture | Dispersion hardness | Heat resistance at 300° C. (DE) |
|---|---|---|---|---|---|---|
| 22 | A-1 | no | 100 | Pristerene 4910 | 90 | 5.1 |
| 23 | A-2 | no | 50 | Pristerene 4910 | 101 | 5.1 |
| 24 | A-3 | no | 210 | Pristerene 4910 | 88 | 5.1 |
| 25 | A-4 | no | 150 | Pristerene 4911 | 95 | 5.2 |
| 26 | A-5 | no | 150 | Pristerene 9429 | 93 | 5.0 |
| 27 | A-6 | no | 100 | Pristerene 4922 | 97 | 5.1 |
| 28 | A-7 | no | 150 | caprylic acid | 94 | 5.0 |
| 29 | A-8 | no | 100 | capric acid | 90 | 5.1 |
| 30 | A-9 | no | 150 | lauric acid | 96 | 5.0 |
| 31 | A-10 | no | 210 | myristic acid | 87 | 5.1 |
| 32 | A-11 | no | 235 | palmitic acid | 86 | 5.0 |
| 33 | A-12 | no | 235 | stearic acid | 85 | 4.9 |
| 34 | A-13 | no | 150 | behenic acid | 96 | 5.1 |
| 35 | A-14 | no | 150 | lignoceric acid | 95 | 5.2 |
| 36 | A-15 | no | 70 | oleic acid | 102 | 5.1 |
| 37 | A-16 | no | 150 | undecylenic acid | 93 | 5.1 |
| 38 | A-17 | no | 150 | nervonic acid | 92 | 4.9 |

Example 39: Production of Pigment Preparation B-1 (Not in Accordance with the Invention)

50 g of Pristerene 4910 were added to an aqueous suspension of pigment B as obtained after step b) of Example 2 and the mixture was stirred for 60 minutes. Aqueous potassium hydroxide solution was subsequently used to establish a pH of 5. Thereafter, the pigment preparation was isolated on a suction filter, washed and dried at 80° C. in a vacuum drying cabinet, and ground for approx. 2 minutes in a standard laboratory mill. (=pigment preparation B-1)

Examples 40 to 86: Production of Pigment Preparations B-2 to B-48 (Not in Accordance with the Invention)

Analogously to Example 39, pigment preparations B-2 to B-48, not in accordance with the invention, were produced in Examples 40 to 86. Here, different aliphatic carboxylic acids B) or mixtures thereof in different amounts, as indicated in Table 3, were in each case added to an aqueous suspension of pigment B as obtained after step b) of Example 2.

Determination of the Dispersion Hardness and the Heat Resistance

For the pigment preparations B-1 to B-48, the dispersion hardness and the heat resistance were respectively determined in accordance with Methods 1 and 2 given below. The values can likewise be found in Table 3.

TABLE 3

Pigment preparations with pigment B

| Example | Pigment preparation | According to the invention | Grams of aliphatic carboxylic acid B) or mixture per mole of pigment | Aliphatic carboxylic acid B) or mixture | Dispersion hardness | Heat resistance at 300° C. (DE) |
|---|---|---|---|---|---|---|
| 39 | B-1 | no | 50 | Pristerene 4910 | 91 | 5.0 |
| 40 | B-2 | no | 100 | Pristerene 4910 | 92 | 5.1 |
| 41 | B-3 | no | 235 | Pristerene 4910 | 92 | 5.0 |
| 42 | B-4 | no | 50 | Pristerene 4911 | 91 | 5.1 |
| 43 | B-5 | no | 100 | Pristerene 4911 | 101 | 4.9 |
| 44 | B-6 | no | 235 | Pristerene 4911 | 98 | 5.2 |
| 45 | B-7 | no | 50 | Pristerene 9429 | 89 | 5.1 |
| 46 | B-8 | no | 70 | Pristerene 9429 | 101 | 5.3 |
| 47 | B-9 | no | 100 | Pristerene 9429 | 100 | 5.2 |
| 48 | B-10 | no | 210 | Pristerene 9429 | 99 | 5.3 |
| 49 | B-11 | no | 50 | Pristerene 4922 | 93 | 4.9 |
| 50 | B-12 | no | 100 | Pristerene 4922 | 92 | 5.0 |
| 51 | B-13 | no | 235 | Pristerene 4922 | 89 | 5.3 |
| 52 | B-14 | no | 50 | caprylic acid | 95 | 5.2 |
| 53 | B-15 | no | 235 | caprylic acid | 97 | 4.9 |
| 54 | B-16 | no | 70 | lignoceric acid | 105 | 5.1 |
| 55 | B-17 | no | 150 | lignoceric acid | 104 | 5.0 |
| 56 | B-18 | no | 70 | nervonic acid | 110 | 4.9 |
| 57 | B-19 | no | 210 | nervonic acid | 112 | 4.9 |
| 58 | B-20 | no | 50 | capric acid | 98 | 5.0 |
| 59 | B-21 | no | 210 | capric acid | 99 | 5.2 |

TABLE 3-continued

Pigment preparations with pigment B

| Example | Pigment preparation | According to the invention | Grams of aliphatic carboxylic acid B) or mixture per mole of pigment | Aliphatic carboxylic acid B) or mixture | Dispersion hardness | Heat resistance at 300° C. (DE) |
|---|---|---|---|---|---|---|
| 60 | B-22 | no | 235 | capric acid | 98 | 5.3 |
| 61 | B-23 | no | 50 | lauric acid | 93 | 5.1 |
| 62 | B-24 | no | 210 | lauric acid | 93 | 4.9 |
| 63 | B-25 | no | 235 | lauric acid | 94 | 5.0 |
| 64 | B-26 | no | 50 | myristic acid | 89 | 4.9 |
| 65 | B-27 | no | 100 | myristic acid | 92 | 5.2 |
| 66 | B-28 | no | 235 | myristic acid | 94 | 5.1 |
| 67 | B-29 | no | 50 | palmitic acid | 96 | 5.1 |
| 68 | B-30 | no | 100 | palmitic acid | 101 | 5.0 |
| 69 | B-31 | no | 210 | palmitic acid | 100 | 5.2 |
| 70 | B-32 | no | 235 | palmitic acid | 99 | 5.1 |
| 71 | B-33 | no | 50 | stearic acid | 102 | 4.9 |
| 72 | B-34 | no | 70 | stearic acid | 101 | 5.2 |
| 73 | B-35 | no | 210 | stearic acid | 99 | 5.1 |
| 74 | B-36 | no | 235 | stearic acid | 102 | 5.1 |
| 75 | B-37 | no | 50 | behenic acid | 110 | 5.0 |
| 76 | B-38 | no | 70 | behenic acid | 112 | 5.1 |
| 77 | B-39 | no | 210 | behenic acid | 110 | 5.0 |
| 78 | B-40 | no | 235 | behenic acid | 112 | 5.2 |
| 79 | B-41 | no | 50 | oleic acid | 98 | 5.1 |
| 80 | B-42 | no | 150 | oleic acid | 96 | 5.0 |
| 81 | B-43 | no | 210 | oleic acid | 98 | 5.2 |
| 82 | B-44 | no | 235 | oleic acid | 95 | 5.1 |
| 83 | B-45 | no | 50 | undecylenic acid | 95 | 5.0 |
| 84 | B-46 | no | 70 | undecylenic acid | 98 | 5.1 |
| 85 | B-47 | no | 210 | undecylenic acid | 97 | 4.9 |
| 86 | B-48 | no | 235 | undecylenic acid | 95 | 5.1 |

Example 87: Production of Pigment Preparation C-1 (Not in Accordance with the Invention)

50 g of Pristerene 4910 were added to an aqueous suspension of pigment C as obtained after step b) of Example 3 and the mixture was stirred for 60 minutes. Aqueous potassium hydroxide solution was subsequently used to establish a pH of 5. Thereafter, the pigment preparation was isolated on a suction filter, washed and dried at 80° C. in a vacuum drying cabinet, and ground for approx. 2 minutes in a standard laboratory mill. (=pigment preparation C-1)

Examples 88 to 143: Production of Pigment Preparations C-2 to C-57 (Not in Accordance with the Invention and According to the Invention)

Analogously to Example 87, pigment preparations C-2 to C-57, not in accordance with the invention and according to the invention, were produced in Examples 88 to 143. Here, different aliphatic carboxylic acids B) or mixtures thereof in different amounts, as indicated in Table 4, were in each case added to an aqueous suspension of pigment C as obtained after step b) of Example 3.

Determination of the Dispersion Hardness and the Heat Resistance

For the pigment preparations C-1 to C-57, the dispersion hardness and the heat resistance were respectively determined in accordance with Methods 1 and 2 given below. The values can likewise be found in Table 4.

TABLE 4

Pigment preparations with pigment C

| Example | Pigment preparation | According to the invention | Grams of aliphatic carboxylic acid B) or mixture per mole of pigment | Aliphatic carboxylic acid B) or mixture | Dispersion hardness | Heat resistance at 300° C. (DE) |
|---|---|---|---|---|---|---|
| 87 | C-1 | no | 50 | Pristerene 4910 | 91 | 5.0 |
| 88 | C-2 | yes | 150 | Pristerene 4910 | 15 | 1.0 |
| 89 | C-3 | yes | 210 | Pristerene 4910 | 8 | 0.9 |
| 90 | C-4 | no | 235 | Pristerene 4910 | 18 | 4.4 |
| 91 | C-5 | no | 50 | Pristerene 4911 | 91 | 5.1 |
| 92 | C-6 | yes | 70 | Pristerene 4911 | 14 | 1.0 |
| 93 | C-7 | yes | 210 | Pristerene 4911 | 8 | 1.0 |
| 94 | C-8 | no | 235 | Pristerene 4911 | 10 | 4.6 |
| 95 | C-9 | no | 50 | Pristerene 9429 | 89 | 5.1 |
| 96 | C-10 | yes | 100 | Pristerene 9429 | 14 | 1.1 |
| 97 | C-11 | yes | 150 | Pristerene 9429 | 13 | 1.1 |

TABLE 4-continued

Pigment preparations with pigment C

| Example | Pigment preparation | According to the invention | Grams of aliphatic carboxylic acid B) or mixture per mole of pigment | Aliphatic carboxylic acid B) or mixture | Dispersion hardness | Heat resistance at 300° C. (DE) |
|---|---|---|---|---|---|---|
| 98 | C-12 | no | 235 | Pristerene 9429 | 14 | 4.8 |
| 99 | C-13 | no | 50 | Pristerene 4922 | 93 | 4.9 |
| 100 | C-14 | yes | 70 | Pristerene 4922 | 15 | 1.0 |
| 101 | C-15 | yes | 210 | Pristerene 4922 | 8 | 0.9 |
| 102 | C-16 | no | 235 | Pristerene 4922 | 10 | 4.4 |
| 103 | C-17 | no | 50 | caprylic acid | 56 | 4.5 |
| 104 | C-18 | no | 150 | caprylic acid | 54 | 4.8 |
| 105 | C-19 | no | 235 | caprylic acid | 45 | 4.9 |
| 106 | C-20 | no | 150 | lignoceric acid | 55 | 5.1 |
| 107 | C-21 | no | 70 | lignoceric acid | 68 | 5.0 |
| 108 | C-22 | no | 210 | lignoceric acid | 52 | 5.1 |
| 109 | C-23 | no | 70 | nervonic acid | 90 | 4.8 |
| 110 | C-24 | no | 150 | nervonic acid | 88 | 4.8 |
| 111 | C-25 | no | 210 | nervonic acid | 85 | 4.9 |
| 112 | C-26 | no | 50 | capric acid | 94 | 5.0 |
| 113 | C-27 | yes | 100 | capric acid | 13 | 1.1 |
| 114 | C-28 | yes | 150 | capric acid | 12 | 1.0 |
| 115 | C-29 | no | 235 | capric acid | 13 | 4.9 |
| 116 | C-30 | no | 50 | lauric acid | 91 | 5.1 |
| 117 | C-31 | yes | 70 | lauric acid | 15 | 1.0 |
| 118 | C-32 | yes | 210 | lauric acid | 8 | 0.9 |
| 119 | C-33 | no | 235 | lauric acid | 9 | 4.6 |
| 120 | C-34 | no | 50 | myristic acid | 89 | 4.9 |
| 121 | C-35 | yes | 70 | myristic acid | 15 | 0.9 |
| 122 | C-36 | yes | 210 | myristic acid | 9 | 0.9 |
| 123 | C-37 | no | 235 | myristic acid | 10 | 4.3 |
| 124 | C-38 | no | 50 | palmitic acid | 90 | 5.1 |
| 125 | C-39 | yes | 70 | palmitic acid | 15 | 0.8 |
| 126 | C-40 | yes | 210 | palmitic acid | 9 | 0.8 |
| 127 | C-41 | no | 235 | palmitic acid | 11 | 4.2 |
| 128 | C-42 | no | 50 | stearic acid | 88 | 4.9 |
| 129 | C-43 | yes | 70 | stearic acid | 15 | 0.7 |
| 130 | C-44 | yes | 210 | stearic acid | 7 | 0.6 |
| 131 | C-45 | no | 235 | stearic acid | 9 | 4.2 |
| 132 | C-46 | no | 50 | behenic acid | 91 | 5.0 |
| 133 | C-47 | yes | 70 | behenic acid | 16 | 0.8 |
| 134 | C-48 | yes | 210 | behenic acid | 9 | 0.9 |
| 135 | C-49 | no | 235 | behenic acid | 12 | 4.8 |
| 136 | C-50 | no | 50 | oleic acid | 90 | 5.1 |
| 137 | C-51 | yes | 70 | oleic acid | 16 | 1.1 |
| 138 | C-52 | yes | 210 | oleic acid | 9 | 1.0 |
| 139 | C-53 | no | 235 | oleic acid | 12 | 4.8 |
| 140 | C-54 | no | 50 | undecylenic acid | 88 | 5.0 |
| 141 | C-55 | yes | 70 | undecylenic acid | 15 | 0.9 |

TABLE 4-continued

| | | | Pigment preparations with pigment C | | | |
|---|---|---|---|---|---|---|
| Example | Pigment preparation | According to the invention | Grams of aliphatic carboxylic acid B) or mixture per mole of pigment | Aliphatic carboxylic acid B) or mixture | Dispersion hardness | Heat resistance at 300° C. (DE) |
| 142 | C-56 | yes | 210 | undecylenic acid | 10 | 0.9 |
| 143 | C-57 | no | 235 | undecylenic acid | 11 | 4.6 |

Example 144: Production of Pigment Preparation D-1 (Not in Accordance with the Invention)

50 g of Pristerene 4910 were added to an aqueous suspension of pigment D as obtained after step b) of Example 4 and the mixture was stirred for 60 minutes. Aqueous potassium hydroxide solution was subsequently used to establish a pH of 5. Thereafter, the pigment preparation was isolated on a suction filter, washed and dried at 80° C. in a vacuum drying cabinet, and ground for approx. 2 minutes in a standard laboratory mill.
(=pigment preparation D-1)

Examples 145 to 177: Production of Pigment Preparations D-2 to D-34 (Not in Accordance with the Invention and According to the Invention)

Analogously to Example 144, pigment preparations according to the invention and not in accordance with the invention were produced in Examples 145 to 177. Here, different aliphatic carboxylic acids B) or mixtures thereof in different amounts, as indicated in Table 5, were in each case added to an aqueous suspension of pigment D as obtained after step b) of Example 4.
Determination of the Dispersion Hardness and the Heat Resistance For the pigment preparations D-1 to D-34, the dispersion hardness and the heat resistance were respectively determined in accordance with Methods 1 and 2 given below. The values can likewise be found in Table 5.

TABLE 5

| | | | Pigment preparations with pigment D | | | |
|---|---|---|---|---|---|---|
| Example | Pigment preparation | According to the invention | Grams of aliphatic carboxylic acid B) or mixture per mole of pigment | Aliphatic carboxylic acid B) or mixture | Dispersion hardness | Heat resistance at 300° C. (DE) |
| 144 | D-1 | no | 50 | Pristerene 4910 | 91 | 5.0 |
| 145 | D-2 | yes | 150 | Pristerene 4910 | 7 | 0.4 |
| 146 | D-3 | yes | 210 | Pristerene 4910 | 5 | 0.4 |
| 147 | D-4 | no | 235 | Pristerene 4910 | 9 | 4.6 |
| 148 | D-5 | no | 50 | caprylic acid | 56 | 4.5 |
| 149 | D-6 | no | 150 | caprylic acid | 55 | 4.9 |
| 150 | D-7 | no | 235 | caprylic acid | 49 | 4.9 |
| 151 | D-8 | no | 70 | nervonic acid | 90 | 4.8 |
| 152 | D-9 | no | 150 | nervonic acid | 89 | 5.0 |
| 153 | D-10 | no | 210 | nervonic acid | 86 | 4.9 |
| 154 | D-11 | no | 50 | capric acid | 94 | 5.0 |
| 155 | D-12 | yes | 100 | capric acid | 10 | 0.6 |
| 156 | D-13 | yes | 150 | capric acid | 8 | 0.5 |
| 157 | D-14 | no | 235 | capric acid | 12 | 4.6 |
| 158 | D-15 | no | 50 | palmitic acid | 90 | 5.1 |
| 159 | D-16 | yes | 70 | palmitic acid | 6 | 0.3 |
| 160 | D-17 | yes | 210 | palmitic acid | 5 | 0.3 |
| 161 | D-18 | no | 235 | palmitic acid | 7 | 4.2 |
| 162 | D-19 | no | 50 | stearic acid | 86 | 4.9 |
| 163 | D-20 | yes | 70 | stearic acid | 6 | 0.4 |
| 164 | D-21 | yes | 210 | stearic acid | 5 | 0.3 |

TABLE 5-continued

Pigment preparations with pigment D

| Example | Pigment preparation | According to the invention | Grams of aliphatic carboxylic acid B) or mixture per mole of pigment | Aliphatic carboxylic acid B) or mixture | Dispersion hardness | Heat resistance at 300° C. (DE) |
|---|---|---|---|---|---|---|
| 165 | D-22 | no | 235 | stearic acid | 8 | 4.6 |
| 166 | D-23 | no | 50 | behenic acid | 91 | 5.0 |
| 167 | D-24 | yes | 70 | behenic acid | 8 | 0.5 |
| 168 | D-25 | yes | 210 | behenic acid | 6 | 0.4 |
| 169 | D-26 | no | 235 | behenic acid | 10 | 4.8 |
| 170 | D-27 | no | 50 | oleic acid | 90 | 5.1 |
| 171 | D-28 | yes | 70 | oleic acid | 8 | 0.6 |
| 172 | D-29 | yes | 210 | oleic acid | 7 | 0.5 |
| 173 | D-30 | no | 235 | oleic acid | 11 | 4.9 |
| 174 | D-31 | no | 50 | undecylenic acid | 88 | 5.0 |
| 175 | D-32 | yes | 70 | undecylenic acid | 7 | 0.4 |
| 176 | D-33 | yes | 210 | undecylenic acid | 7 | 0.4 |
| 177 | D-34 | no | 235 | undecylenic acid | 9 | 4.9 |

Example 178: Production of Pigment Preparation E-1 (Not in Accordance with the Invention)

50 g of Pristerene 4910 were added to an aqueous suspension of pigment E as obtained after step b) of Example 5 and the mixture was stirred for 60 minutes. Aqueous potassium hydroxide solution was subsequently used to establish a pH of 5. Thereafter, the pigment preparation was isolated on a suction filter, washed and dried at 80° C. in a vacuum drying cabinet, and ground for approx. 2 minutes in a standard laboratory mill. (=pigment preparation E-1)

Examples 179 to 259: Production of Pigment Preparations E-2 to E-81 (Not in Accordance with the Invention and According to the Invention)

Analogously to Example 178, pigment preparations E-2 to E-81, according to the invention and not in accordance with the invention, were produced in Examples 179 to 259. Here, different aliphatic carboxylic acids B) or mixtures thereof in different amounts, as indicated in Table 6, were in each case added to an aqueous suspension of pigment E as obtained after step b) of Example 5.

Determination of the Dispersion Hardness and the Heat Resistance

For the pigment preparations E-1 to E-81, the dispersion hardness and the heat resistance were respectively determined in accordance with Methods 1 and 2 given below. The values can likewise be found in Table 6.

TABLE 6

Pigment preparations with pigment E

| Example | Pigment preparation | According to the invention | Grams of aliphatic carboxylic acid B) or mixture per mole of pigment | Aliphatic carboxylic acid B) or mixture | Dispersion hardness | Heat resistance at 300° C. (DE) |
|---|---|---|---|---|---|---|
| 178 | E-1 | no | 50 | Pristerene 4910 | 91 | 5.0 |
| 179 | E-2 | yes | 70 | Pristerene 4910 | 6 | 0.4 |
| 180 | E-3 | yes | 100 | Pristerene 4910 | 6 | 0.4 |
| 181 | E-4 | yes | 150 | Pristerene 4910 | 5 | 0.3 |
| 182 | E-5 | yes | 210 | Pristerene 4910 | 5 | 0.4 |
| 183 | E-6 | no | 235 | Pristerene 4910 | 9 | 4.6 |
| 184 | E-7 | no | 50 | Pristerene 4911 | 91 | 5.1 |
| 185 | E-8 | yes | 70 | Pristerene 4911 | 7 | 0.5 |
| 186 | E-9 | yes | 100 | Pristerene 4911 | 6 | 0.5 |
| 187 | E-10 | yes | 150 | Pristerene 4911 | 6 | 0.4 |
| 188 | E-11 | yes | 210 | Pristerene 4911 | 5 | 0.5 |
| 189 | E-12 | no | 235 | Pristerene 4911 | 10 | 4.2 |
| 190 | E-13 | no | 50 | Pristerene 9429 | 89 | 5.1 |
| 191 | E-14 | yes | 70 | Pristerene 9429 | 7 | 0.4 |
| 192 | E-15 | yes | 100 | Pristerene 9429 | 7 | 0.4 |
| 193 | E-16 | yes | 150 | Pristerene 9429 | 6 | 0.3 |
| 194 | E-17 | yes | 210 | Pristerene 9429 | 6 | 0.5 |
| 195 | E-18 | no | 235 | Pristerene 9429 | 9 | 4.6 |
| 196 | E-19 | no | 50 | Pristerene 4922 | 93 | 4.9 |
| 197 | E-20 | yes | 70 | Pristerene 4922 | 7 | 0.5 |
| 199 | E-21 | yes | 100 | Pristerene 4922 | 7 | 0.5 |
| 200 | E-22 | yes | 150 | Pristerene 4922 | 7 | 0.4 |
| 201 | E-23 | yes | 210 | Pristerene 4922 | 6 | 0.5 |
| 202 | E-24 | no | 235 | Pristerene 4922 | 8 | 4.3 |
| 203 | E-25 | no | 50 | caprylic acid | 56 | 4.5 |

TABLE 6-continued

Pigment preparations with pigment E

| Example | Pigment preparation | According to the invention | Grams of aliphatic carboxylic acid B) or mixture per mole of pigment | Aliphatic carboxylic acid B) or mixture | Dispersion hardness | Heat resistance at 300° C. (DE) |
|---|---|---|---|---|---|---|
| 204 | E-26 | no | 150 | caprylic acid | 54 | 4.8 |
| 205 | E-27 | no | 235 | caprylic acid | 45 | 4.9 |
| 206 | E-28 | no | 150 | lignoceric acid | 55 | 5.1 |
| 207 | E-29 | no | 70 | lignoceric acid | 68 | 5.0 |
| 208 | E-30 | no | 210 | lignoceric acid | 52 | 5.1 |
| 209 | E-31 | no | 70 | nervonic acid | 90 | 4.8 |
| 210 | E-32 | no | 150 | nervonic acid | 88 | 4.8 |
| 211 | E-33 | no | 210 | nervonic acid | 85 | 4.9 |
| 212 | E-34 | no | 50 | capric acid | 94 | 5.0 |
| 213 | E-35 | yes | 70 | capric acid | 9 | 0.6 |
| 214 | E-36 | yes | 100 | capric acid | 9 | 0.6 |
| 215 | E-37 | yes | 150 | capric acid | 8 | 0.5 |
| 216 | E-38 | yes | 210 | capric acid | 8 | 0.6 |
| 217 | E-39 | no | 235 | capric acid | 10 | 4.6 |
| 218 | E-40 | no | 50 | lauric acid | 91 | 5.1 |
| 219 | E-41 | yes | 70 | lauric acid | 9 | 0.5 |
| 220 | E-42 | yes | 100 | lauric acid | 9 | 0.5 |
| 221 | E-43 | yes | 150 | lauric acid | 9 | 0.4 |
| 222 | E-44 | yes | 210 | lauric acid | 8 | 0.5 |
| 223 | E-45 | no | 235 | lauric acid | 10 | 4.8 |
| 224 | E-46 | no | 50 | myristic acid | 89 | 4.9 |
| 225 | E-47 | yes | 70 | myristic acid | 8 | 0.5 |
| 226 | E-48 | yes | 100 | myristic acid | 8 | 0.5 |
| 227 | E-49 | yes | 150 | myristic acid | 7 | 0.5 |
| 228 | E-50 | yes | 210 | myristic acid | 7 | 0.6 |
| 229 | E-51 | no | 235 | myristic acid | 11 | 4.3 |
| 230 | E-52 | no | 50 | palmitic acid | 90 | 5.1 |
| 231 | E-53 | yes | 70 | palmitic acid | 6 | 0.4 |
| 232 | E-54 | yes | 100 | palmitic acid | 6 | 0.4 |
| 233 | E-55 | yes | 150 | palmitic acid | 5 | 0.3 |
| 234 | E-56 | yes | 210 | palmitic acid | 5 | 0.4 |
| 235 | E-56 | no | 235 | palmitic acid | 9 | 4.3 |
| 236 | E-58 | no | 50 | stearic acid | 88 | 4.9 |
| 237 | E-59 | yes | 70 | stearic acid | 6 | 0.3 |
| 238 | E-60 | yes | 100 | stearic acid | 5 | 0.3 |
| 239 | E-61 | yes | 150 | stearic acid | 5 | 0.4 |
| 240 | E-62 | yes | 210 | stearic acid | 4 | 0.4 |
| 241 | E-63 | no | 235 | stearic acid | 8 | 4.5 |
| 242 | E-64 | no | 50 | behenic acid | 91 | 5.0 |
| 243 | E-65 | yes | 70 | behenic acid | 8 | 0.5 |
| 244 | E-66 | yes | 100 | behenic acid | 8 | 0.5 |
| 245 | E-67 | yes | 150 | behenic acid | 7 | 0.4 |
| 246 | E-68 | yes | 210 | behenic acid | 7 | 0.5 |
| 247 | E-69 | no | 235 | behenic acid | 9 | 4.6 |
| 248 | E-70 | no | 50 | oleic acid | 90 | 5.1 |
| 249 | E-71 | yes | 70 | oleic acid | 9 | 0.6 |
| 250 | E-72 | yes | 100 | oleic acid | 8 | 0.6 |
| 251 | E-73 | yes | 150 | oleic acid | 8 | 0.5 |
| 252 | E-74 | yes | 210 | oleic acid | 7 | 0.6 |
| 253 | E-75 | no | 235 | oleic acid | 12 | 4.3 |
| 254 | E-76 | no | 50 | undecylenic acid | 88 | 5.0 |
| 255 | E-77 | yes | 70 | undecylenic acid | 8 | 0.5 |
| 256 | E-78 | yes | 100 | undecylenic acid | 8 | 0.5 |
| 257 | E-79 | yes | 150 | undecylenic acid | 7 | 0.6 |
| 258 | E-80 | yes | 210 | undecylenic acid | 7 | 0.6 |
| 259 | E-81 | no | 235 | undecylenic acid | 10 | 4.2 |

Example 260: Production of Pigment Preparation F-1 (Not in Accordance with the Invention)

50 g of Pristerene 4910 were added to an aqueous suspension of pigment F as obtained after step b) of Example 6 and the mixture was stirred for 60 minutes. Aqueous potassium hydroxide solution was subsequently used to establish a pH of 5. Thereafter, the pigment preparation was isolated on a suction filter, washed and dried at 80° C. in a vacuum drying cabinet, and ground for approx. 2 minutes in a standard laboratory mill. (=pigment preparation F-1)

Examples 261 to 293: Production of Pigment Preparations F-2 to F-33 (Not in Accordance with the Invention and According to the Invention)

Analogously to Example 260, pigment preparations F-2 to F-33, according to the invention and not in accordance with the invention, were produced in Examples 261 to 293. Here, different aliphatic carboxylic acids B) or mixtures thereof in different amounts, as indicated in Table 7, were in each case added to an aqueous suspension of pigment F as obtained after step b) of Example 6.

Determination of the Dispersion Hardness and the Heat Resistance

For the pigment preparations F-1 to F-33, the dispersion hardness and the heat resistance were respectively determined in accordance with Methods 1 and 2 given below. The values can likewise be found in Table 7.

Examples 295 to 374: Production of Pigment Preparations G-2 to G-81 (Not in Accordance with the Invention and According to the Invention)

Analogously to Example 294, pigment preparations G-2 to G-81, according to the invention and not in accordance

TABLE 7

Pigment preparations with pigment F

| Example | Pigment preparation | According to the invention | Grams of aliphatic carboxylic acid B) or mixture per mole of pigment | Aliphatic carboxylic acid B) or mixture | Dispersion hardness | Heat resistance at 300° C. (DE) |
|---|---|---|---|---|---|---|
| 260 | F-1  | no  | 50  | Pristerene 4910 | 90 | 5.0 |
| 261 | F-2  | yes | 100 | Pristerene 4910 | 3  | 0.2 |
| 262 | F-3  | yes | 210 | Pristerene 4910 | 3  | 0.1 |
| 263 | F-4  | no  | 235 | Pristerene 4910 | 5  | 4.1 |
| 264 | F-5  | no  | 50  | caprylic acid   | 56 | 4.5 |
| 265 | F-6  | no  | 150 | caprylic acid   | 56 | 4.9 |
| 266 | F-7  | no  | 235 | caprylic acid   | 48 | 4.9 |
| 267 | F-8  | no  | 70  | nervonic acid   | 91 | 4.8 |
| 268 | F-9  | no  | 150 | nervonic acid   | 88 | 5.0 |
| 269 | F-10 | no  | 210 | nervonic acid   | 86 | 4.9 |
| 270 | F-11 | no  | 50  | capric acid     | 94 | 5.0 |
| 271 | F-12 | yes | 100 | capric acid     | 3  | 0.2 |
| 272 | F-13 | yes | 150 | capric acid     | 2  | 0.2 |
| 273 | F-14 | no  | 235 | capric acid     | 6  | 4.1 |
| 274 | F-15 | no  | 50  | palmitic acid   | 90 | 5.1 |
| 275 | F-16 | yes | 70  | palmitic acid   | 2  | 0.1 |
| 276 | F-17 | yes | 210 | palmitic acid   | 2  | 0.1 |
| 277 | F-18 | no  | 235 | palmitic acid   | 5  | 3.9 |
| 278 | F-19 | no  | 50  | stearic acid    | 86 | 4.9 |
| 279 | F-20 | yes | 70  | stearic acid    | 2  | 0.1 |
| 280 | F-21 | yes | 210 | stearic acid    | 2  | 0.1 |
| 281 | F-22 | no  | 235 | stearic acid    | 6  | 4.2 |
| 282 | F-23 | no  | 50  | behenic acid    | 91 | 5.0 |
| 283 | F-24 | yes | 70  | behenic acid    | 3  | 0.2 |
| 284 | F-25 | yes | 210 | behenic acid    | 2  | 0.2 |
| 285 | F-26 | no  | 235 | behenic acid    | 14 | 4.1 |
| 286 | F-27 | no  | 50  | oleic acid      | 3  | 0.2 |
| 287 | F-28 | yes | 70  | oleic acid      | 2  | 0.2 |
| 288 | F-29 | yes | 210 | oleic acid      | 2  | 0.2 |
| 289 | F-30 | no  | 235 | oleic acid      | 6  | 4.3 |
| 290 | F-30 | no  | 50  | undecylenic acid | 88 | 5.0 |
| 291 | F-31 | yes | 70  | undecylenic acid | 3  | 0.2 |
| 292 | F-32 | yes | 210 | undecylenic acid | 2  | 0.3 |
| 293 | F-33 | no  | 235 | undecylenic acid | 6  | 4.5 |

Example 294: Production of Pigment Preparation G-1 (Not in Accordance with the Invention)

50 g of Pristerene 4910 were added to an aqueous suspension of pigment G as obtained after step b) of Example 7 and the mixture was stirred for 60 minutes. Aqueous potassium hydroxide solution was subsequently used to establish a pH of 5. Thereafter, the pigment preparation was isolated on a suction filter, washed and dried at 80° C. in a vacuum drying cabinet, and ground for approx. 2 minutes in a standard laboratory mill. (=pigment preparation G-1)

with the invention, were produced in Examples 295 to 374. Here, different aliphatic carboxylic acids B) or mixtures thereof in different amounts, as indicated in Table 8, were in each case added to an aqueous suspension of pigment G as obtained after step b) of Example 7.

Determination of the Dispersion Hardness and the Heat Resistance

For the pigment preparations G-1 to G-81, the dispersion hardness and the heat resistance were respectively determined in accordance with Methods 1 and 2 given below. The values can likewise be found in Table 8.

TABLE 8

| | | | Grams of aliphatic | | | Heat |
| | | According | carboxylic acid B) | Aliphatic | | resistance |
| | Pigment | to the | or mixture per | carboxylic acid B) | Dispersion | at 300° C. |
| Example | preparation | invention | mole of pigment | or mixture | hardness | (DE) |
|---|---|---|---|---|---|---|
| 294 | G-1 | No | 50 | Pristerene 4910 | 70 | 5.3 |
| 295 | G-2 | Yes | 70 | Pristerene 4910 | 3 | 0.1 |
| 296 | G-3 | yes | 100 | Pristerene 4910 | 3 | 0.1 |
| 297 | G-4 | yes | 150 | Pristerene 4910 | 2 | 0.1 |
| 298 | G-5 | yes | 210 | Pristerene 4910 | 2 | 0.1 |
| 299 | G-6 | no | 235 | Pristerene 4910 | 5 | 4.5 |
| 300 | G-7 | no | 50 | Pristerene 4911 | 72 | 5.3 |
| 301 | G-8 | yes | 70 | Pristerene 4911 | 3 | 0.2 |
| 302 | G-9 | yes | 100 | Pristerene 4911 | 3 | 0.2 |
| 303 | G-10 | yes | 150 | Pristerene 4911 | 3 | 0.1 |
| 304 | G-11 | yes | 210 | Pristerene 4911 | 2 | 0.1 |
| 305 | G-12 | no | 235 | Pristerene 4911 | 6 | 4.6 |
| 306 | G-13 | no | 50 | Pristerene 9429 | 70 | 5.5 |
| 307 | G-14 | yes | 70 | Pristerene 9429 | 4 | 0.2 |
| 308 | G-15 | yes | 100 | Pristerene 9429 | 4 | 0.2 |
| 309 | G-16 | yes | 150 | Pristerene 9429 | 4 | 0.1 |
| 310 | G-17 | yes | 210 | Pristerene 9429 | 3 | 0.1 |
| 311 | G-18 | no | 235 | Pristerene 9429 | 7 | 4.6 |
| 312 | G-19 | no | 50 | Pristerene 4922 | 82 | 5.2 |
| 313 | G-20 | yes | 70 | Pristerene 4922 | 3 | 0.2 |
| 314 | G-21 | yes | 100 | Pristerene 4922 | 3 | 0.2 |
| 315 | G-22 | yes | 150 | Pristerene 4922 | 3 | 0.2 |
| 316 | G-23 | yes | 210 | Pristerene 4922 | 2 | 0.3 |
| 317 | G-24 | no | 235 | Pristerene 4922 | 6 | 4.5 |
| 318 | G-25 | no | 50 | caprylic acid | 56 | 5.2 |
| 319 | G-26 | no | 150 | caprylic acid | 59 | 5.2 |
| 320 | G-27 | no | 235 | caprylic acid | 46 | 5.1 |
| 321 | G-28 | no | 150 | lignoceric acid | 54 | 4.9 |
| 322 | G-29 | no | 70 | lignoceric acid | 70 | 4.9 |
| 323 | G-30 | no | 210 | lignoceric acid | 53 | 5.1 |
| 324 | G-31 | no | 70 | nervonic acid | 88 | 4.8 |
| 325 | G-32 | no | 150 | nervonic acid | 85 | 4.8 |
| 326 | G-33 | no | 210 | nervonic acid | 84 | 4.9 |
| 327 | G-34 | no | 50 | capric acid | 73 | 5.3 |
| 328 | G-35 | yes | 70 | capric acid | 5 | 0.3 |
| 329 | G-36 | yes | 100 | capric acid | 5 | 0.2 |
| 330 | G-37 | yes | 150 | capric acid | 4 | 0.3 |
| 331 | G-38 | yes | 210 | capric acid | 4 | 0.3 |
| 332 | G-39 | no | 235 | capric acid | 8 | 4.5 |
| 333 | G-40 | no | 50 | lauric acid | 70 | 5.3 |
| 334 | G-41 | yes | 70 | lauric acid | 4 | 0.2 |
| 335 | G-42 | yes | 100 | lauric acid | 4 | 0.2 |
| 336 | G-43 | yes | 150 | lauric acid | 4 | 0.2 |
| 337 | G-44 | yes | 210 | lauric acid | 3 | 0.3 |
| 338 | G-45 | no | 235 | lauric acid | 8 | 4.4 |
| 339 | G-46 | no | 50 | myristic acid | 71 | 5.2 |
| 340 | G-47 | yes | 70 | myristic acid | 4 | 0.1 |
| 341 | G-48 | yes | 100 | myristic acid | 4 | 0.1 |
| 342 | G-49 | yes | 150 | myristic acid | 3 | 0.2 |
| 343 | G-50 | yes | 210 | myristic acid | 3 | 0.2 |
| 344 | G-51 | no | 235 | myristic acid | 8 | 4.2 |
| 345 | G-52 | no | 50 | palmitic acid | 69 | 5.3 |
| 346 | G-53 | yes | 70 | palmitic acid | 3 | 0.1 |
| 347 | G-54 | yes | 100 | palmitic acid | 3 | 0.1 |
| 348 | G-55 | yes | 150 | palmitic acid | 2 | 0.1 |
| 349 | G-56 | yes | 210 | palmitic acid | 2 | 0.2 |
| 350 | G-57 | no | 235 | palmitic acid | 5 | 4.1 |
| 351 | G-58 | no | 50 | stearic acid | 68 | 5.2 |
| 352 | G-59 | yes | 70 | stearic acid | 2 | 0.1 |
| 353 | G-60 | yes | 100 | stearic acid | 2 | 0.1 |
| 354 | G-61 | yes | 150 | stearic acid | 2 | 0.1 |
| 355 | G-62 | yes | 210 | stearic acid | 2 | 0.2 |
| 356 | G-63 | no | 235 | stearic acid | 4 | 4.1 |
| 357 | G-64 | no | 50 | behenic acid | 75 | 5.3 |
| 358 | G-65 | yes | 70 | behenic acid | 4 | 0.2 |
| 359 | G-66 | yes | 100 | behenic acid | 4 | 0.2 |
| 360 | G-67 | yes | 150 | behenic acid | 3 | 0.2 |
| 361 | G-68 | yes | 210 | behenic acid | 3 | 0.3 |
| 362 | G-69 | no | 235 | behenic acid | 6 | 4.3 |
| 363 | G-70 | no | 50 | oleic acid | 69 | 5.2 |
| 364 | G-71 | yes | 70 | oleic acid | 5 | 0.2 |
| 365 | G-72 | yes | 100 | oleic acid | 5 | 0.2 |
| 366 | G-73 | yes | 150 | oleic acid | 4 | 0.2 |

TABLE 8-continued

Pigment preparations with pigment G

| Example | Pigment preparation | According to the invention | Grams of aliphatic carboxylic acid B) or mixture per mole of pigment | Aliphatic carboxylic acid B) or mixture | Dispersion hardness | Heat resistance at 300° C. (DE) |
|---|---|---|---|---|---|---|
| 367 | G-74 | yes | 210 | oleic acid | 4 | 0.3 |
| 368 | G-75 | no | 235 | oleic acid | 9 | 4.4 |
| 369 | G-76 | no | 50 | undecylenic acid | 73 | 5.1 |
| 370 | G-77 | yes | 70 | undecylenic acid | 4 | 0.2 |
| 371 | G-78 | yes | 100 | undecylenic acid | 4 | 0.2 |
| 372 | G-79 | yes | 150 | undecylenic acid | 4 | 0.3 |
| 373 | G-80 | yes | 210 | undecylenic acid | 3 | 0.3 |
| 374 | G-81 | no | 235 | undecylenic acid | 8 | 4.3 |

Example 375: Production of Pigment Preparation H-1 (Not in Accordance with the Invention)

50 g of Pristerene 4910 were added to an aqueous suspension of pigment H as obtained after step b) of Example 8 and the mixture was stirred for 60 minutes. Aqueous potassium hydroxide solution was subsequently used to establish a pH of 5. Thereafter, the pigment preparation was isolated on a suction filter, washed and dried at 80° C. in a vacuum drying cabinet, and ground for approx. 2 minutes in a standard laboratory mill. (=pigment preparation H-1)

Examples 376 to 406: Production of Pigment Preparations H-2 to H-35 (Not in Accordance with the Invention and According to the Invention)

Analogously to Example 375, pigment preparations H-2 to H-35, according to the invention and not in accordance with the invention, were produced in Examples 376 to 406. Here, different aliphatic carboxylic acids B) or mixtures thereof in different amounts, as indicated in Table 9, were in each case added to an aqueous suspension of pigment H as obtained after step b) of Example 8.

Determination of the Dispersion Hardness and the Heat Resistance

For the pigment preparations H-1 to H-35, the dispersion hardness and the heat resistance were respectively determined in accordance with Methods 1 and 2 given below. The values can likewise be found in Table 9.

TABLE 9

Pigment preparations with pigment H

| Example | Pigment preparation | According to the invention | Grams of aliphatic carboxylic acid B) or mixture per mole of pigment | Aliphatic carboxylic acid B) or mixture | Dispersion hardness | Heat resistance at 300° C. (DE) |
|---|---|---|---|---|---|---|
| 375 | H-1 | no | 50 | Pristerene 4910 | 69 | 5.0 |
| 376 | H-2 | yes | 100 | Pristerene 4910 | 3 | 0.2 |
| 377 | H-3 | yes | 210 | Pristerene 4910 | 3 | 0.2 |
| 378 | H-4 | no | 235 | Pristerene 4910 | 7 | 4.1 |
| 379 | H-5 | no | 150 | caprylic acid | 57 | 4.9 |
| 380 | H-6 | no | 210 | caprylic acid | 51 | 5.1 |
| 381 | H-7 | no | 150 | nervonic acid | 89 | 5.3 |
| 382 | H-8 | no | 210 | nervonic acid | 85 | 5.1 |
| 383 | H-9 | no | 50 | capric acid | 92 | 5.0 |
| 384 | H-10 | yes | 100 | capric acid | 3 | 0.2 |
| 385 | H-11 | yes | 150 | capric acid | 4 | 0.2 |
| 386 | H-12 | no | 235 | capric acid | 9 | 4.2 |
| 387 | H-13 | no | 50 | palmitic acid | 90 | 5.1 |
| 388 | H-14 | yes | 70 | palmitic acid | 3 | 0.1 |
| 389 | H-15 | yes | 210 | palmitic acid | 3 | 0.2 |
| 390 | H-16 | no | 235 | palmitic acid | 7 | 4.2 |
| 391 | H-17 | no | 50 | stearic acid | 85 | 4.9 |
| 392 | H-18 | yes | 70 | stearic acid | 3 | 0.1 |
| 393 | H-19 | yes | 210 | stearic acid | 3 | 0.2 |
| 394 | H-20 | no | 235 | stearic acid | 8 | 4.2 |
| 395 | H-21 | no | 50 | behenic acid | 90 | 5.0 |
| 396 | H-22 | yes | 70 | behenic acid | 4 | 0.3 |
| 397 | H-23 | yes | 210 | behenic acid | 4 | 0.3 |
| 398 | H-24 | no | 235 | behenic acid | 8 | 4.1 |
| 399 | H-25 | no | 50 | oleic acid | 89 | 5.1 |
| 400 | H-26 | yes | 70 | oleic acid | 5 | 0.3 |
| 401 | H-27 | yes | 210 | oleic acid | 4 | 0.3 |
| 402 | H-28 | no | 235 | oleic acid | 9 | 4.6 |
| 403 | H-29 | no | 50 | undecylenic acid | 88 | 5.0 |
| 404 | H-30 | yes | 70 | undecylenic acid | 4 | 0.3 |

TABLE 9-continued

Pigment preparations with pigment H

| Example | Pigment preparation | According to the invention | Grams of aliphatic carboxylic acid B) or mixture per mole of pigment | Aliphatic carboxylic acid B) or mixture | Dispersion hardness | Heat resistance at 300° C. (DE) |
|---|---|---|---|---|---|---|
| 405 | H-31 | yes | 210 | undecylenic acid | 4 | 0.3 |
| 406 | H-32 | no | 235 | undecylenic acid | 13 | 4.3 |

Example 407: Production of Pigment Preparation I-1 (Not in Accordance with the Invention)

50 g of Pristerene 4910 were added to an aqueous suspension of pigment I as obtained after step b) of Example 9 and the mixture was stirred for 60 minutes. Aqueous potassium hydroxide solution was subsequently used to establish a pH of 5. Thereafter, the pigment preparation was isolated on a suction filter, washed and dried at 80° C. in a vacuum drying cabinet, and ground for approx. 2 minutes in a standard laboratory mill. (=pigment preparation I-1)

Examples 408 to 438: Production of Pigment Preparations I-2 to I-32 (Not in Accordance with the Invention and According to the Invention)

Analogously to Example 407, pigment preparations I-2 to I-32, according to the invention and not in accordance with the invention, were produced in Examples 408 to 438. Here, different aliphatic carboxylic acids B) or mixtures thereof in different amounts, as indicated in Table 10, were in each case added to an aqueous suspension of pigment I as obtained after step b) of Example 9.

Determination of the Dispersion Hardness and the Heat Resistance

For the pigment preparations I-1 to I-32, the dispersion hardness and the heat resistance were respectively determined in accordance with Methods 1 and 2 given below. The values can likewise be found in Table 10.

TABLE 10

Pigment preparations with pigment I

| Example | Pigment preparation | According to the invention | Grams of aliphatic carboxylic acid B) or mixture per mole of pigment | Aliphatic carboxylic acid B) or mixture | Dispersion hardness | Heat resistance at 300° C. (DE) |
|---|---|---|---|---|---|---|
| 407 | I-1 | no | 50 | Pristerene 4910 | 33 | 5.0 |
| 408 | I-2 | yes | 100 | Pristerene 4910 | 4 | 0.2 |
| 409 | I-3 | yes | 210 | Pristerene 4910 | 4 | 0.2 |
| 410 | I-4 | no | 235 | Pristerene 4910 | 6 | 4.5 |
| 411 | I-5 | no | 150 | caprylic acid | 35 | 4.9 |
| 412 | I-6 | no | 210 | caprylic acid | 34 | 5.1 |
| 413 | I-7 | no | 150 | nervonic acid | 36 | 5.3 |
| 414 | I-8 | no | 210 | nervonic acid | 34 | 5.1 |
| 415 | I-9 | no | 50 | capric acid | 34 | 5.0 |
| 416 | I-10 | yes | 100 | capric acid | 5 | 0.3 |
| 417 | I-11 | yes | 150 | capric acid | 5 | 0.3 |
| 418 | I-12 | no | 235 | capric acid | 4 | 4.8 |
| 419 | I-13 | no | 50 | palmitic acid | 36 | 5.1 |
| 420 | I-14 | yes | 70 | palmitic acid | 4 | 0.2 |
| 421 | I-15 | yes | 210 | palmitic acid | 4 | 0.2 |
| 422 | I-16 | no | 235 | palmitic acid | 7 | 4.5 |
| 423 | I-17 | no | 50 | stearic acid | 33 | 4.9 |
| 424 | I-18 | yes | 150 | stearic acid | 4 | 0.1 |
| 425 | I-19 | yes | 210 | stearic acid | 3 | 0.2 |
| 426 | I-20 | no | 235 | stearic acid | 6 | 4.9 |
| 427 | I-21 | no | 50 | behenic acid | 38 | 5.0 |
| 428 | I-22 | yes | 70 | behenic acid | 5 | 0.3 |
| 429 | I-23 | yes | 210 | behenic acid | 4 | 0.3 |
| 430 | I-24 | no | 235 | behenic acid | 8 | 4.5 |
| 431 | I-25 | no | 50 | oleic acid | 40 | 5.1 |
| 432 | I-26 | yes | 70 | oleic acid | 5 | 0.3 |
| 433 | I-27 | yes | 210 | oleic acid | 5 | 0.3 |
| 434 | I-28 | no | 235 | oleic acid | 9 | 4.8 |
| 435 | I-29 | no | 50 | undecylenic acid | 42 | 5.0 |
| 436 | I-30 | yes | 70 | undecylenic acid | 4 | 0.2 |
| 437 | I-31 | yes | 210 | undecylenic acid | 5 | 0.2 |
| 438 | I-32 | no | 235 | undecylenic acid | 9 | 4.9 |

Example 439: Production of Pigment Preparation J-1 (not in Accordance with the Invention)

50 g of Pristerene 4910 were added to an aqueous suspension of pigment J as obtained after step b) of Example 10 and the mixture was stirred for 60 minutes. Aqueous potassium hydroxide solution was subsequently used to establish a pH of 5. Thereafter, the pigment preparation was isolated on a suction filter, washed and dried at 80° C. in a vacuum drying cabinet, and ground for approx. 2 minutes in a standard laboratory mill. (=pigment preparation J-1)

Examples 440 to 469: Production of Pigment Preparations J-2 to J-32 (Not in Accordance with the Invention and According to the Invention)

Analogously to Example 407, pigment preparations I-2 to I-32, according to the invention and not in accordance with the invention, were produced in Examples 408 to 438. Here, different aliphatic carboxylic acids B) or mixtures thereof in different amounts, as indicated in Table 11, were in each case added to an aqueous suspension of pigment J as obtained after step b) of Example 10.

Determination of the Dispersion Hardness and the Heat Resistance

For the pigment preparations J-1 to J-32, the dispersion hardness and the heat resistance were respectively determined in accordance with Methods 1 and 2 given below. The values can likewise be found in Table 11.

Example 470: Production of Pigment Preparation K-1 (Not in Accordance with the Invention)

50 g of Pristerene 4910 were added to an aqueous suspension of pigment K as obtained after step b) of Example 11 and the mixture was stirred for 60 minutes. Aqueous potassium hydroxide solution was subsequently used to establish a pH of 5. Thereafter, the pigment preparation was isolated on a suction filter, washed and dried at 80° C. in a vacuum drying cabinet, and ground for approx. 2 minutes in a standard laboratory mill. (=pigment preparation K-1)

Examples 471 to 501: Production of Pigment Preparations K-2 to K-32 (Not in Accordance with the Invention and According to the Invention)

Analogously to Example 470, pigment preparations K-2 to K-32, according to the invention and not in accordance with the invention, were produced in Examples 408 to 438. Here, different aliphatic carboxylic acids B) or mixtures thereof in different amounts, as indicated in Table 12, were in each case added to an aqueous suspension of pigment K as obtained after step b) of Example 11.

Determination of the Dispersion Hardness and the Heat Resistance

For the pigment preparations K-1 to K-32, the dispersion hardness and the heat resistance were respectively determined in accordance with Methods 1 and 2 given below. The values can likewise be found in Table 12.

TABLE 11

Pigment preparations with pigment J

| Example | Pigment preparation | According to the invention | Grams of aliphatic carboxylic acid B) or mixture per mole of pigment | Aliphatic carboxylic acid B) or mixture | Dispersion hardness | Heat resistance at 300° C. (DE) |
|---|---|---|---|---|---|---|
| 439 | J-1 | no | 50 | Pristerene 4910 | 37 | 5.0 |
| 440 | J-2 | yes | 100 | Pristerene 4910 | 7 | 0.4 |
| 441 | J-3 | yes | 210 | Pristerene 4910 | 6 | 0.4 |
| 442 | J-4 | no | 235 | Pristerene 4910 | 9 | 4.6 |
| 443 | J-5 | no | 150 | caprylic acid | 41 | 4.9 |
| 444 | J-6 | no | 210 | caprylic acid | 42 | 5.1 |
| 445 | J-7 | no | 150 | nervonic acid | 40 | 5.3 |
| 446 | J-8 | no | 210 | nervonic acid | 39 | 5.1 |
| 447 | J-9 | no | 50 | capric acid | 36 | 5.0 |
| 448 | J-10 | yes | 100 | capric acid | 8 | 0.5 |
| 449 | J-11 | yes | 150 | capric acid | 8 | 0.4 |
| 450 | J-12 | no | 235 | capric acid | 11 | 4.2 |
| 451 | J-13 | no | 50 | palmitic acid | 38 | 5.2 |
| 452 | J-14 | yes | 70 | palmitic acid | 7 | 0.4 |
| 453 | J-15 | yes | 210 | palmitic acid | 6 | 0.4 |
| 454 | J-16 | no | 235 | palmitic acid | 10 | 4.6 |
| 455 | J-17 | no | 50 | stearic acid | 39 | 4.9 |
| 456 | J-18 | yes | 150 | stearic acid | 6 | 0.3 |
| 457 | J-19 | yes | 210 | stearic acid | 6 | 0.3 |
| 458 | J-20 | no | 235 | stearic acid | 9 | 4.6 |
| 459 | J-21 | no | 50 | behenic acid | 40 | 5.0 |
| 460 | J-22 | yes | 70 | behenic acid | 8 | 0.5 |
| 461 | J-23 | yes | 210 | behenic acid | 8 | 0.6 |
| 462 | J-24 | no | 235 | behenic acid | 12 | 4.3 |
| 463 | J-25 | no | 50 | oleic acid | 45 | 5.1 |
| 464 | J-26 | yes | 70 | oleic acid | 9 | 0.5 |
| 465 | J-27 | yes | 210 | oleic acid | 8 | 0.5 |
| 466 | J-28 | no | 235 | oleic acid | 11 | 4.9 |
| 467 | J-29 | no | 50 | undecylenic acid | 48 | 5.0 |
| 468 | J-30 | yes | 70 | undecylenic acid | 8 | 0.6 |
| 468 | J-31 | yes | 210 | undecylenic acid | 8 | 0.5 |
| 469 | J-32 | no | 235 | undecylenic acid | 11 | 4.9 |

TABLE 12

Pigment preparations with pigment K

| Example | Pigment preparation | According to the invention | Grams of aliphatic carboxylic acid B) or mixture per mole of pigment | Aliphatic carboxylic acid B) or mixture | Dispersion hardness | Heat resistance at 300° C. (DE) |
|---|---|---|---|---|---|---|
| 470 | K-1  | no  | 50  | Pristerene 4910 | 49 | 5.1 |
| 471 | K-2  | yes | 70  | Pristerene 4910 | 9  | 0.5 |
| 472 | K-3  | yes | 210 | Pristerene 4910 | 8  | 0.6 |
| 473 | K-4  | no  | 235 | Pristerene 4910 | 11 | 4.5 |
| 474 | K-5  | no  | 100 | caprylic acid   | 51 | 5.2 |
| 475 | K-6  | no  | 210 | caprylic acid   | 52 | 5.3 |
| 476 | K-7  | no  | 70  | nervonic acid   | 48 | 5.4 |
| 477 | K-8  | no  | 210 | nervonic acid   | 48 | 5.1 |
| 478 | K-9  | no  | 50  | myristic acid   | 48 | 5.2 |
| 479 | K-10 | yes | 100 | myristic acid   | 10 | 0.6 |
| 480 | K-11 | yes | 210 | myristic acid   | 9  | 0.6 |
| 481 | K-12 | no  | 235 | myristic acid   | 13 | 4.6 |
| 482 | K-13 | no  | 50  | palmitic acid   | 45 | 5.2 |
| 483 | K-14 | yes | 100 | palmitic acid   | 9  | 0.5 |
| 484 | K-15 | yes | 210 | palmitic acid   | 8  | 0.5 |
| 485 | K-16 | no  | 235 | palmitic acid   | 12 | 4.7 |
| 486 | K-17 | no  | 50  | stearic acid    | 43 | 5.2 |
| 487 | K-18 | yes | 70  | stearic acid    | 8  | 0.5 |
| 488 | K-19 | yes | 210 | stearic acid    | 8  | 0.5 |
| 489 | K-20 | no  | 235 | stearic acid    | 11 | 4.8 |
| 490 | K-21 | no  | 50  | behenic acid    | 44 | 5.1 |
| 491 | K-22 | yes | 150 | behenic acid    | 9  | 0.6 |
| 492 | K-23 | yes | 210 | behenic acid    | 8  | 0.6 |
| 493 | K-24 | no  | 235 | behenic acid    | 12 | 4.9 |
| 494 | K-25 | no  | 50  | oleic acid      | 48 | 5.1 |
| 495 | K-26 | yes | 70  | oleic acid      | 10 | 0.6 |
| 496 | K-27 | yes | 210 | oleic acid      | 10 | 0.6 |
| 497 | K-28 | no  | 235 | oleic acid      | 13 | 4.9 |
| 498 | K-29 | no  | 50  | undecylenic acid | 52 | 5.2 |
| 499 | K-30 | yes | 70  | undecylenic acid | 9 | 0.5 |
| 500 | K-31 | yes | 210 | undecylenic acid | 9 | 0.6 |
| 501 | K-32 | no  | 235 | undecylenic acid | 14 | 5.1 |

Example 502: Production of Pigment Preparation L-1 (Not in Accordance with the Invention)

50 g of Pristerene 4910 were added to an aqueous suspension of pigment L as obtained after step b) of Example 12 and the mixture was stirred for 60 minutes. Aqueous potassium hydroxide solution was subsequently used to establish a pH of 5. Thereafter, the pigment preparation was isolated on a suction filter, washed and dried at 80° C. in a vacuum drying cabinet, and ground for approx. 2 minutes in a standard laboratory mill. (=pigment preparation L-1)

Examples 503 to 533: Production of Pigment Preparations L-2 to L-32 (Not in Accordance with the Invention and According to the Invention)

Analogously to Example 502, pigment preparations L-2 to L-32, according to the invention and not in accordance with the invention, were produced in Examples 503 to 533. Here, different aliphatic carboxylic acids B) or mixtures thereof in different amounts, as indicated in Table 13, were in each case added to an aqueous suspension of pigment L as obtained after step b) of Example 12.

Determination of the Dispersion Hardness and the Heat Resistance

For the pigment preparations L-1 to L-32, the dispersion hardness and the heat resistance were respectively determined in accordance with Methods 1 and 2 given below. The values can likewise be found in Table 13.

TABLE 13

Pigment preparations with pigment L

| Example | Pigment preparation | According to the invention | Grams of aliphatic carboxylic acid B) or mixture per mole of pigment | Aliphatic carboxylic acid B) or mixture | Dispersion hardness | Heat resistance at 300° C. (DE) |
|---|---|---|---|---|---|---|
| 502 | L-1 | no  | 50  | Pristerene 4910 | 60 | 5.1 |
| 503 | L-2 | yes | 100 | Pristerene 4910 | 11 | 0.7 |
| 504 | L-3 | yes | 210 | Pristerene 4910 | 12 | 0.7 |
| 505 | L-4 | no  | 235 | Pristerene 4910 | 13 | 4.6 |
| 506 | L-5 | no  | 70  | caprylic acid   | 59 | 5.2 |
| 507 | L-6 | no  | 210 | caprylic acid   | 58 | 5.3 |
| 508 | L-7 | no  | 70  | nervonic acid   | 53 | 5.3 |
| 509 | L-8 | no  | 210 | nervonic acid   | 55 | 5.2 |

TABLE 13-continued

Pigment preparations with pigment L

| Example | Pigment preparation | According to the invention | Grams of aliphatic carboxylic acid B) or mixture per mole of pigment | Aliphatic carboxylic acid B) or mixture | Dispersion hardness | Heat resistance at 300° C. (DE) |
|---|---|---|---|---|---|---|
| 510 | L-9 | no | 50 | myristic acid | 52 | 5.2 |
| 511 | L-10 | yes | 100 | myristic acid | 12 | 0.8 |
| 512 | L-11 | yes | 150 | myristic acid | 11 | 0.7 |
| 513 | L-12 | no | 235 | myristic acid | 22 | 4.5 |
| 514 | L-13 | no | 50 | palmitic acid | 56 | 5.2 |
| 515 | L-14 | yes | 150 | palmitic acid | 9 | 0.7 |
| 516 | L-15 | yes | 210 | palmitic acid | 9 | 0.7 |
| 517 | L-16 | no | 235 | palmitic acid | 13 | 4.7 |
| 518 | L-17 | no | 50 | stearic acid | 55 | 5.2 |
| 519 | L-18 | yes | 100 | stearic acid | 9 | 0.7 |
| 520 | L-19 | yes | 210 | stearic acid | 8 | 0.7 |
| 521 | L-20 | no | 235 | stearic acid | 13 | 4.6 |
| 522 | L-21 | no | 50 | behenic acid | 58 | 5.1 |
| 523 | L-22 | yes | 150 | behenic acid | 11 | 0.8 |
| 524 | L-23 | yes | 210 | behenic acid | 10 | 0.7 |
| 525 | L-24 | no | 235 | behenic acid | 16 | 4.9 |
| 526 | L-25 | no | 50 | oleic acid | 60 | 5.1 |
| 527 | L-26 | yes | 70 | oleic acid | 12 | 0.8 |
| 528 | L-27 | yes | 210 | oleic acid | 11 | 0.9 |
| 529 | L-28 | no | 235 | oleic acid | 16 | 4.8 |
| 530 | L-29 | no | 50 | undecylenic acid | 58 | 5.2 |
| 531 | L-30 | yes | 100 | undecylenic acid | 11 | 0.8 |
| 532 | L-31 | yes | 210 | undecylenic acid | 10 | 0.8 |
| 533 | L-32 | no | 235 | undecylenic acid | 16 | 5.0 |

Example 534: Production of Pigment Preparation M-1 (Not in Accordance with the Invention)

50 g of Pristerene 4910 were added to an aqueous suspension of pigment M as obtained after step b) of Example 13 and the mixture was stirred for 60 minutes. Aqueous potassium hydroxide solution was subsequently used to establish a pH of 5. Thereafter, the pigment preparation was isolated on a suction filter, washed and dried at 80° C. in a vacuum drying cabinet, and ground for approx. 2 minutes in a standard laboratory mill. (=pigment preparation M-1)

Examples 535 to 565: Production of Pigment Preparations M-2 to M-32 (Not in Accordance with the Invention and According to the Invention)

Analogously to Example 470, pigment preparations M-2 to M-32, according to the invention and not in accordance with the invention, were produced in Examples 535 to 565. Here, different aliphatic carboxylic acids B) or mixtures thereof in different amounts, as indicated in Table 14, were in each case added to an aqueous suspension of pigment M as obtained after step b) of Example 13.

Determination of the Dispersion Hardness and the Heat Resistance

For the pigment preparations M-1 to M-32, the dispersion hardness and the heat resistance were respectively determined in accordance with Methods 1 and 2 given below. The values can likewise be found in Table 14.

TABLE 14

Pigment preparations with pigment M

| Example | Pigment preparation | According to the invention | Grams of aliphatic carboxylic acid B) or mixture per mole of pigment | Aliphatic carboxylic acid B) or mixture | Dispersion hardness | Heat resistance at 300° C. (DE) |
|---|---|---|---|---|---|---|
| 534 | M-1 | no | 50 | Pristerene 4910 | 68 | 5.1 |
| 535 | M-2 | yes | 100 | Pristerene 4910 | 13 | 0.8 |
| 536 | M-3 | yes | 210 | Pristerene 4910 | 12 | 0.9 |
| 537 | M-4 | no | 235 | Pristerene 4910 | 18 | 4.6 |
| 538 | M-5 | no | 70 | caprylic acid | 65 | 5.1 |
| 539 | M-6 | no | 210 | caprylic acid | 69 | 5.2 |
| 540 | M-7 | no | 70 | nervonic acid | 71 | 5.2 |
| 541 | M-8 | no | 210 | nervonic acid | 73 | 5.3 |
| 542 | M-9 | no | 50 | myristic acid | 65 | 5.2 |
| 543 | M-10 | yes | 100 | myristic acid | 14 | 0.9 |
| 544 | M-11 | yes | 150 | myristic acid | 13 | 0.8 |
| 545 | M-12 | no | 235 | myristic acid | 21 | 4.6 |
| 546 | M-13 | no | 50 | palmitic acid | 66 | 5.1 |
| 547 | M-14 | yes | 150 | palmitic acid | 12 | 0.8 |
| 548 | M-15 | yes | 210 | palmitic acid | 11 | 0.9 |
| 549 | M-16 | no | 235 | palmitic acid | 18 | 4.8 |

TABLE 14-continued

Pigment preparations with pigment M

| Example | Pigment preparation | According to the invention | Grams of aliphatic carboxylic acid B) or mixture per mole of pigment | Aliphatic carboxylic acid B) or mixture | Dispersion hardness | Heat resistance at 300° C. (DE) |
|---|---|---|---|---|---|---|
| 550 | M-17 | no | 50 | stearic acid | 67 | 5.0 |
| 551 | M-18 | yes | 100 | stearic acid | 12 | 0.8 |
| 552 | M-19 | yes | 210 | stearic acid | 11 | 0.8 |
| 553 | M-20 | no | 235 | stearic acid | 16 | 4.9 |
| 554 | M-21 | no | 50 | behenic acid | 66 | 5.1 |
| 555 | M-22 | yes | 150 | behenic acid | 14 | 0.9 |
| 556 | M-23 | yes | 210 | behenic acid | 13 | 0.9 |
| 557 | M-24 | no | 235 | behenic acid | 22 | 4.8 |
| 558 | M-25 | no | 50 | oleic acid | 69 | 5.1 |
| 559 | M-26 | yes | 70 | oleic acid | 15 | 0.8 |
| 560 | M-27 | yes | 210 | oleic acid | 14 | 0.9 |
| 561 | M-28 | no | 235 | oleic acid | 24 | 4.9 |
| 562 | M-29 | no | 50 | undecylenic acid | 66 | 5.2 |
| 563 | M-30 | yes | 100 | undecylenic acid | 13 | 0.9 |
| 564 | M-31 | yes | 210 | undecylenic acid | 12 | 0.9 |
| 565 | M-32 | no | 235 | undecylenic acid | 16 | 5.0 |

Example 566: Production of Pigment Preparation N-1 (Not in Accordance with the Invention)

50 g of Pristerene 4910 were added to an aqueous suspension of pigment N as obtained after step b) of Example 14 and the mixture was stirred for 60 minutes. Aqueous potassium hydroxide solution was subsequently used to establish a pH of 5. Thereafter, the pigment preparation was isolated on a suction filter, washed and dried at 80° C. in a vacuum drying cabinet, and ground for approx. 2 minutes in a standard laboratory mill. (=pigment preparation N-1)

Examples 567 to 597: Production of Pigment Preparations N-2 to N-32 (Not in Accordance with the Invention and According to the Invention)

Analogously to Example 567, pigment preparations N-2 to N-32, according to the invention and not in accordance with the invention, were produced in Examples 568 to 597. Here, different aliphatic carboxylic acids B) or mixtures thereof in different amounts, as indicated in Table 15, were in each case added to an aqueous suspension of pigment N as obtained after step b) of Example 14.

Determination of the Dispersion Hardness and the Heat Resistance

For the pigment preparations N-1 to N-32, the dispersion hardness and the heat resistance were respectively determined in accordance with Methods 1 and 2 given below. The values can likewise be found in Table 15.

TABLE 15

Pigment preparations with pigment N

| Example | Pigment preparation | According to the invention | Grams of aliphatic carboxylic acid B) or mixture per mole of pigment | Aliphatic carboxylic acid B) or mixture | Dispersion hardness | Heat resistance at 300° C. (DE) |
|---|---|---|---|---|---|---|
| 566 | N-1 | no | 50 | Pristerene 4910 | 70 | 5.1 |
| 567 | N-2 | yes | 100 | Pristerene 4910 | 14 | 0.9 |
| 568 | N-3 | yes | 210 | Pristerene 4910 | 14 | 0.9 |
| 569 | N-4 | no | 235 | Pristerene 4910 | 19 | 4.7 |
| 570 | N-5 | no | 70 | caprylic acid | 66 | 5.0 |
| 571 | N-6 | no | 210 | caprylic acid | 65 | 5.3 |
| 572 | N-7 | no | 70 | nervonic acid | 70 | 5.3 |
| 573 | N-8 | no | 210 | nervonic acid | 71 | 5.1 |
| 574 | N-9 | no | 50 | myristic acid | 66 | 5.1 |
| 575 | N-10 | yes | 100 | myristic acid | 15 | 1.0 |
| 576 | N-11 | yes | 150 | myristic acid | 15 | 1.0 |
| 577 | N-12 | no | 235 | myristic acid | 23 | 4.9 |
| 578 | N-13 | no | 50 | palmitic acid | 68 | 5.1 |
| 579 | N-14 | yes | 150 | palmitic acid | 13 | 0.9 |
| 580 | N-15 | yes | 210 | palmitic acid | 13 | 0.8 |
| 581 | N-16 | no | 235 | palmitic acid | 19 | 4.9 |
| 582 | N-17 | no | 50 | stearic acid | 65 | 5.1 |
| 583 | N-18 | yes | 100 | stearic acid | 13 | 0.9 |
| 584 | N-19 | yes | 210 | stearic acid | 12 | 0.8 |
| 585 | N-20 | no | 235 | stearic acid | 20 | 4.9 |
| 586 | N-21 | no | 50 | behenic acid | 67 | 5.1 |
| 587 | N-22 | yes | 150 | behenic acid | 15 | 0.9 |
| 588 | N-23 | yes | 210 | behenic acid | 14 | 0.9 |
| 589 | N-24 | no | 235 | behenic acid | 23 | 4.9 |

TABLE 15-continued

Pigment preparations with pigment N

| Example | Pigment preparation | According to the invention | Grams of aliphatic carboxylic acid B) or mixture per mole of pigment | Aliphatic carboxylic acid B) or mixture | Dispersion hardness | Heat resistance at 300° C. (DE) |
|---|---|---|---|---|---|---|
| 590 | N-25 | no | 50 | oleic acid | 70 | 5.1 |
| 591 | N-26 | yes | 70 | oleic acid | 15 | 1.0 |
| 592 | N-27 | yes | 210 | oleic acid | 15 | 1.0 |
| 593 | N-28 | no | 235 | oleic acid | 27 | 4.8 |
| 594 | N-29 | no | 50 | undecylenic acid | 68 | 5.2 |
| 595 | N-30 | yes | 100 | undecylenic acid | 14 | 0.9 |
| 596 | N-31 | yes | 210 | undecylenic acid | 14 | 0.9 |
| 597 | N-32 | no | 235 | undecylenic acid | 28 | 4.9 |

Example 598: Production of Pigment Preparation O-1 (Not in Accordance with the Invention)

50 g of Pristerene 4910 were added to an aqueous suspension of pigment O as obtained after step b) of Example 15 and the mixture was stirred for 60 minutes. Aqueous potassium hydroxide solution was subsequently used to establish a pH of 5. Thereafter, the pigment preparation was isolated on a suction filter, washed and dried at 80° C. in a vacuum drying cabinet, and ground for approx. 2 minutes in a standard laboratory mill. (=pigment preparation O-1)

Examples 599 to 629: Production of Pigment Preparations O-2 to O-32 (Not in Accordance with the Invention and According to the Invention)

Analogously to Example 598, pigment preparations O-2 to O-32, according to the invention and not in accordance with the invention, were produced in Examples 599 to 629. Here, different aliphatic carboxylic acids B) or mixtures thereof in different amounts, as indicated in Table 16, were in each case added to an aqueous suspension of pigment O as obtained after step b) of Example 15.

Determination of the Dispersion Hardness and the Heat Resistance

For the pigment preparations O-1 to O-32, the dispersion hardness and the heat resistance were respectively determined in accordance with Methods 1 and 2 given below. The values can likewise be found in Table 16.

TABLE 16

Pigment preparations with pigment O

| Example | Pigment preparation | According to the invention | Grams of aliphatic carboxylic acid B) or mixture per mole of pigment | Aliphatic carboxylic acid B) or mixture | Dispersion hardness | Heat resistance at 300° C. (DE) |
|---|---|---|---|---|---|---|
| 598 | O-1 | no | 50 | Pristerene 4910 | 75 | 5.1 |
| 599 | O-2 | yes | 100 | Pristerene 4910 | 14 | 1.0 |
| 600 | O-3 | yes | 210 | Pristerene 4910 | 13 | 0.9 |
| 601 | O-4 | no | 235 | Pristerene 4910 | 18 | 4.7 |
| 602 | O-5 | no | 70 | caprylic acid | 74 | 5.2 |
| 603 | O-6 | no | 210 | caprylic acid | 71 | 5.3 |
| 604 | O-7 | no | 70 | nervonic acid | 73 | 5.1 |
| 605 | O-8 | no | 210 | nervonic acid | 72 | 5.0 |
| 606 | O-9 | no | 50 | myristic acid | 74 | 5.3 |
| 607 | O-10 | yes | 100 | myristic acid | 13 | 1.0 |
| 608 | O-11 | yes | 150 | myristic acid | 11 | 0.9 |
| 609 | O-12 | no | 235 | myristic acid | 14 | 4.9 |
| 610 | O-13 | no | 50 | palmitic acid | 72 | 5.1 |
| 611 | O-14 | yes | 150 | palmitic acid | 12 | 1.0 |
| 612 | O-15 | yes | 210 | palmitic acid | 9 | 0.9 |
| 613 | O-16 | no | 235 | palmitic acid | 12 | 4.9 |
| 614 | O-17 | no | 50 | stearic acid | 70 | 5.0 |
| 615 | O-18 | yes | 100 | stearic acid | 12 | 0.9 |
| 616 | O-19 | yes | 210 | stearic acid | 11 | 0.8 |
| 617 | O-20 | no | 235 | stearic acid | 14 | 4.8 |
| 618 | O-21 | no | 50 | behenic acid | 73 | 5.0 |
| 619 | O-22 | yes | 150 | behenic acid | 13 | 0.9 |
| 620 | O-23 | yes | 210 | behenic acid | 12 | 0.8 |
| 621 | O-24 | no | 235 | behenic acid | 16 | 4.9 |
| 622 | O-25 | no | 50 | oleic acid | 73 | 5.1 |
| 623 | O-26 | yes | 70 | oleic acid | 14 | 0.9 |
| 624 | O-27 | yes | 210 | oleic acid | 12 | 0.9 |
| 625 | O-28 | no | 235 | oleic acid | 18 | 5.1 |
| 626 | O-29 | no | 50 | undecylenic acid | 74 | 5.2 |
| 627 | O-30 | yes | 100 | undecylenic acid | 14 | 0.9 |

TABLE 16-continued

Pigment preparations with pigment O

| Example | Pigment preparation | According to the invention | Grams of aliphatic carboxylic acid B) or mixture per mole of pigment | Aliphatic carboxylic acid B) or mixture | Dispersion hardness | Heat resistance at 300° C. (DE) |
|---|---|---|---|---|---|---|
| 628 | O-31 | yes | 210 | undecylenic acid | 12 | 0.9 |
| 629 | O-32 | no | 235 | undecylenic acid | 15 | 5.1 |

Example 630: Production of Pigment Preparation P-1 (Not in Accordance with the Invention)

50 g of Pristerene 4910 were added to an aqueous suspension of pigment P as obtained after step b) of Example 16 and the mixture was stirred for 60 minutes. Aqueous potassium hydroxide solution was subsequently used to establish a pH of 5. Thereafter, the pigment preparation was isolated on a suction filter, washed and dried at 80° C. in a vacuum drying cabinet, and ground for approx. 2 minutes in a standard laboratory mill. (=pigment preparation P-1)

Examples 631 to 661: Production of Pigment Preparations P-2 to P-32 (Not in Accordance with the Invention and According to the Invention)

Analogously to Example 630, pigment preparations P-2 to P-32, according to the invention and not in accordance with the invention, were produced in Examples 631 to 661. Here, different aliphatic carboxylic acids B) or mixtures thereof in different amounts, as indicated in Table 17, were in each case added to an aqueous suspension of pigment P as obtained after step b) of Example 16.

Determination of the Dispersion Hardness and the Heat Resistance

For the pigment preparations P-1 to P-32, the dispersion hardness and the heat resistance were respectively determined in accordance with Methods 1 and 2 given below. The values can likewise be found in Table 17.

TABLE 17

Pigment preparations with pigment P

| Example | Pigment preparation | According to the invention | Grams of aliphatic carboxylic acid B) or mixture per mole of pigment | Aliphatic carboxylic acid B) or mixture | Dispersion hardness | Heat resistance at 300° C. (DE) |
|---|---|---|---|---|---|---|
| 630 | P-1 | no | 50 | Pristerene 4910 | 74 | 5.1 |
| 631 | P-2 | yes | 100 | Pristerene 4910 | 14 | 0.9 |
| 632 | P-3 | yes | 210 | Pristerene 4910 | 12 | 0.9 |
| 633 | P-4 | no | 235 | Pristerene 4910 | 19 | 4.6 |
| 634 | P-5 | no | 70 | caprylic acid | 74 | 5.1 |
| 635 | P-6 | no | 210 | caprylic acid | 71 | 5.2 |
| 636 | P-7 | no | 70 | nervonic acid | 73 | 5.2 |
| 637 | P-8 | no | 210 | nervonic acid | 72 | 5.3 |
| 638 | P-9 | no | 50 | myristic acid | 74 | 5.2 |
| 639 | P-10 | yes | 100 | myristic acid | 14 | 1.0 |
| 640 | P-11 | yes | 150 | myristic acid | 13 | 1.1 |
| 641 | P-12 | no | 235 | myristic acid | 20 | 4.8 |
| 642 | P-13 | no | 50 | palmitic acid | 72 | 5.1 |
| 643 | P-14 | yes | 150 | palmitic acid | 14 | 0.9 |
| 644 | P-15 | yes | 210 | palmitic acid | 13 | 0.9 |
| 645 | P-16 | no | 235 | palmitic acid | 19 | 4.8 |
| 646 | P-17 | no | 50 | stearic acid | 70 | 5.0 |
| 647 | P-18 | yes | 100 | stearic acid | 13 | 1.0 |
| 648 | P-19 | yes | 210 | stearic acid | 11 | 1.0 |
| 649 | P-20 | no | 235 | stearic acid | 18 | 4.9 |
| 650 | P-21 | no | 50 | behenic acid | 73 | 5.1 |
| 651 | P-22 | yes | 150 | behenic acid | 13 | 1.0 |
| 652 | P-23 | yes | 210 | behenic acid | 10 | 0.9 |
| 653 | P-24 | no | 235 | behenic acid | 16 | 4.8 |
| 654 | P-25 | no | 50 | oleic acid | 73 | 5.1 |
| 655 | P-26 | yes | 70 | oleic acid | 14 | 1.0 |
| 656 | P-27 | yes | 210 | oleic acid | 12 | 0.9 |
| 657 | P-28 | no | 235 | oleic acid | 22 | 4.9 |
| 658 | P-29 | no | 50 | undecylenic acid | 74 | 5.2 |
| 659 | P-30 | yes | 100 | undecylenic acid | 14 | 1.0 |
| 660 | P-31 | yes | 210 | undecylenic acid | 12 | 0.9 |
| 661 | P-32 | no | 235 | undecylenic acid | 20 | 5.0 |

Example 662: Production of Pigment Preparation Q-1 (Not in Accordance with the Invention)

50 g of Pristerene 4910 were added to an aqueous suspension of pigment Q as obtained after step b) of Example 17 and the mixture was stirred for 60 minutes. Aqueous potassium hydroxide solution was subsequently used to establish a pH of 5. Thereafter, the pigment preparation was isolated on a suction filter, washed and dried at 80° C. in a vacuum drying cabinet, and ground for approx. 2 minutes in a standard laboratory mill. (=pigment preparation Q-1)

Examples 663 to 694: Production of Pigment Preparations Q-2 to Q-32 (Not in Accordance with the Invention and According to the Invention)

Analogously to Example 662, pigment preparations Q-2 to Q-32, according to the invention and not in accordance with the invention, were produced in Examples 663 to 694. Here, different aliphatic carboxylic acids B) or mixtures thereof in different amounts, as indicated in Table 18, were in each case added to an aqueous suspension of pigment Q as obtained after step b) of Example 17.
Determination of the Dispersion Hardness and the Heat Resistance For the pigment preparations Q-1 to Q-32, the dispersion hardness and the heat resistance were respectively determined in accordance with Methods 1 and 2 given below. The values can likewise be found in Table 18.

Example 695: Production of Pigment Preparation R-1 (Not in Accordance with the Invention)

50 g of Pristerene 4910 were added to an aqueous suspension of pigment R as obtained after step b) of Example 18 and the mixture was stirred for 60 minutes. Aqueous potassium hydroxide solution was subsequently used to establish a pH of 5. Thereafter, the pigment preparation was isolated on a suction filter, washed and dried at 80° C. in a vacuum drying cabinet, and ground for approx. 2 minutes in a standard laboratory mill. (=pigment preparation R-1)

Examples 696 to 726: Production of Pigment Preparations R-2 to R-32 (Not in Accordance with the Invention and According to the Invention)

Analogously to Example 695, pigment preparations R-2 to R-32, according to the invention and not in accordance with the invention, were produced in Examples 696 to 726. Here, different aliphatic carboxylic acids B) or mixtures thereof in different amounts, as indicated in Table 19, were in each case added to an aqueous suspension of pigment R as obtained after step b) of Example 18.
Determination of the Dispersion Hardness and the Heat Resistance For the pigment preparations R-1 to R-32, the dispersion hardness and the heat resistance were respectively determined in accordance with Methods 1 and 2 given below. The values can likewise be found in Table 19.

TABLE 18

Pigment preparations with pigment Q

| Example | Pigment preparation | According to the invention | Grams of aliphatic carboxylic acid B) or mixture per mole of pigment | Aliphatic carboxylic acid B) or mixture | Dispersion hardness | Heat resistance at 300° C. (DE) |
|---|---|---|---|---|---|---|
| 662 | Q-1 | no | 50 | Pristerene 4910 | 74 | 5.1 |
| 663 | Q-2 | yes | 100 | Pristerene 4910 | 15 | 1.0 |
| 664 | Q-3 | yes | 210 | Pristerene 4910 | 13 | 0.9 |
| 665 | Q-4 | no | 235 | Pristerene 4910 | 24 | 4.8 |
| 666 | Q-5 | no | 70 | caprylic acid | 73 | 5.0 |
| 667 | Q-6 | no | 210 | caprylic acid | 72 | 5.1 |
| 668 | Q-7 | no | 70 | nervonic acid | 72 | 5.3 |
| 669 | Q-8 | no | 210 | nervonic acid | 70 | 5.4 |
| 670 | Q-9 | no | 50 | myristic acid | 71 | 5.3 |
| 671 | Q-10 | yes | 100 | myristic acid | 15 | 0.8 |
| 672 | Q-11 | yes | 150 | myristic acid | 13 | 0.9 |
| 673 | Q-12 | no | 235 | myristic acid | 21 | 4.9 |
| 674 | Q-13 | no | 50 | palmitic acid | 69 | 5.2 |
| 675 | Q-14 | yes | 150 | palmitic acid | 14 | 0.9 |
| 676 | Q-15 | yes | 210 | palmitic acid | 12 | 0.8 |
| 678 | Q-16 | no | 235 | palmitic acid | 19 | 4.9 |
| 679 | Q-17 | no | 50 | stearic acid | 68 | 5.1 |
| 680 | Q-18 | yes | 100 | stearic acid | 14 | 0.9 |
| 681 | Q-19 | yes | 210 | stearic acid | 12 | 1.0 |
| 682 | Q-20 | no | 235 | stearic acid | 21 | 5.1 |
| 683 | Q-21 | no | 50 | behenic acid | 78 | 5.1 |
| 684 | Q-22 | yes | 150 | behenic acid | 14 | 1.0 |
| 685 | Q-23 | yes | 210 | behenic acid | 13 | 0.9 |
| 686 | Q-24 | no | 235 | behenic acid | 26 | 4.9 |
| 687 | Q-25 | no | 50 | oleic acid | 75 | 5.1 |
| 688 | Q-26 | yes | 100 | oleic acid | 14 | 1.0 |
| 689 | Q-27 | yes | 210 | oleic acid | 13 | 0.9 |
| 690 | Q-28 | no | 235 | oleic acid | 20 | 4.8 |
| 691 | Q-29 | no | 50 | undecylenic acid | 76 | 5.2 |
| 692 | Q-30 | yes | 70 | undecylenic acid | 14 | 1.0 |
| 693 | Q-31 | yes | 210 | undecylenic acid | 12 | 0.9 |
| 694 | Q-32 | no | 235 | undecylenic acid | 26 | 5.1 |

TABLE 19

Pigment preparations with pigment R

| Example | Pigment preparation | According to the invention | Grams of aliphatic carboxylic acid B) or mixture per mole of pigment | Aliphatic carboxylic acid B) or mixture | Dispersion hardness | Heat resistance at 300° C. (DE) |
|---|---|---|---|---|---|---|
| 695 | R-1 | no | 50 | Pristerene 4910 | 74 | 5.1 |
| 696 | R-2 | yes | 100 | Pristerene 4910 | 15 | 1.0 |
| 697 | R-3 | yes | 210 | Pristerene 4910 | 14 | 0.9 |
| 698 | R-4 | no | 235 | Pristerene 4910 | 23 | 4.8 |
| 699 | R-5 | no | 70 | caprylic acid | 74 | 5.0 |
| 700 | R-6 | no | 210 | caprylic acid | 69 | 5.1 |
| 701 | R-7 | no | 70 | nervonic acid | 72 | 5.3 |
| 702 | R-8 | no | 210 | nervonic acid | 71 | 5.0 |
| 703 | R-9 | no | 50 | myristic acid | 72 | 5.1 |
| 704 | R-10 | yes | 100 | myristic acid | 15 | 1.0 |
| 705 | R-11 | yes | 150 | myristic acid | 14 | 1.1 |
| 706 | R-12 | no | 235 | myristic acid | 30 | 5.0 |
| 707 | R-13 | no | 50 | palmitic acid | 72 | 5.2 |
| 708 | R-14 | yes | 150 | palmitic acid | 14 | 1.0 |
| 709 | R-15 | yes | 210 | palmitic acid | 12 | 0.9 |
| 710 | R-16 | no | 235 | palmitic acid | 25 | 4.9 |
| 711 | R-17 | no | 50 | stearic acid | 70 | 5.1 |
| 712 | R-18 | yes | 100 | stearic acid | 13 | 1.0 |
| 713 | R-19 | yes | 210 | stearic acid | 12 | 0.9 |
| 714 | R-20 | no | 235 | stearic acid | 21 | 4.9 |
| 715 | R-21 | no | 50 | behenic acid | 73 | 5.1 |
| 716 | R-22 | yes | 150 | behenic acid | 14 | 1.0 |
| 717 | R-23 | yes | 210 | behenic acid | 13 | 0.9 |
| 718 | R-24 | no | 235 | behenic acid | 29 | 4.9 |
| 719 | R-25 | no | 50 | oleic acid | 73 | 5.1 |
| 720 | R-26 | yes | 70 | oleic acid | 14 | 1.1 |
| 721 | R-27 | yes | 210 | oleic acid | 13 | 1.1 |
| 722 | R-28 | no | 235 | oleic acid | 28 | 4.8 |
| 723 | R-29 | no | 50 | undecylenic acid | 74 | 5.2 |
| 724 | R-30 | yes | 100 | undecylenic acid | 14 | 1.0 |
| 725 | R-31 | yes | 210 | undecylenic acid | 13 | 1.0 |
| 726 | R-32 | no | 235 | undecylenic acid | 21 | 5.1 |

Example 727: Production of Pigment Preparation S-1 (not in Accordance with the Invention)

50 g of Pristerene 4910 were added to an aqueous suspension of pigment S as obtained after step b) of Example 19 and the mixture was stirred for 60 minutes. Aqueous potassium hydroxide solution was subsequently used to establish a pH of 5. Thereafter, the pigment preparation was isolated on a suction filter, washed and dried at 80° C. in a vacuum drying cabinet, and ground for approx. 2 minutes in a standard laboratory mill. (=pigment preparation S-1)

Examples 728 to 760: Production of Pigment Preparations S-2 to S-32 (Not in Accordance with the Invention and According to the Invention)

Analogously to Example 727, pigment preparations S-2 to S-32, according to the invention and not in accordance with the invention, were produced in Examples 728 to 760. Here, different aliphatic carboxylic acids B) or mixtures thereof in different amounts, as indicated in Table 20, were in each case added to an aqueous suspension of pigment S as obtained after step b) of Example 19.

Determination of the Dispersion Hardness and the Heat Resistance

For the pigment preparations S-1 to S-32, the dispersion hardness and the heat resistance were respectively determined in accordance with Methods 1 and 2 given below. The values can likewise be found in Table 20.

TABLE 20

Pigment preparations with pigment S

| Example | Pigment preparation | According to the invention | Grams of aliphatic carboxylic acid B) or mixture per mole of pigment | Aliphatic carboxylic acid B) or mixture | Dispersion hardness | Heat resistance at 300° C. (DE) |
|---|---|---|---|---|---|---|
| 727 | S-1 | no | 50 | Pristerene 4910 | 74 | 5.1 |
| 728 | S-2 | no | 100 | Pristerene 4910 | 75 | 5.0 |
| 729 | S-3 | no | 210 | Pristerene 4910 | 74 | 4.9 |
| 730 | S-4 | no | 235 | Pristerene 4910 | 76 | 4.6 |
| 731 | S-5 | no | 70 | caprylic acid | 74 | 5.1 |
| 734 | S-6 | no | 210 | caprylic acid | 71 | 5.2 |
| 735 | S-7 | no | 70 | nervonic acid | 73 | 5.2 |

TABLE 20-continued

| | | | Pigment preparations with pigment S | | | |
|---|---|---|---|---|---|---|
| Example | Pigment preparation | According to the invention | Grams of aliphatic carboxylic acid B) or mixture per mole of pigment | Aliphatic carboxylic acid B) or mixture | Dispersion hardness | Heat resistance at 300° C. (DE) |
| 736 | S-8 | no | 210 | nervonic acid | 72 | 5.3 |
| 737 | S-9 | no | 50 | myristic acid | 74 | 5.2 |
| 738 | S-10 | no | 100 | myristic acid | 70 | 5.1 |
| 739 | S-11 | no | 150 | myristic acid | 72 | 5.1 |
| 740 | S-12 | no | 235 | myristic acid | 74 | 4.8 |
| 741 | S-13 | no | 50 | palmitic acid | 73 | 5.1 |
| 742 | S-14 | no | 150 | palmitic acid | 74 | 5.0 |
| 743 | S-15 | no | 210 | palmitic acid | 73 | 5.1 |
| 744 | S-16 | no | 235 | palmitic acid | 70 | 4.8 |
| 745 | S-17 | no | 50 | stearic acid | 70 | 5.0 |
| 746 | S-18 | no | 100 | stearic acid | 69 | 5.1 |
| 747 | S-19 | no | 210 | stearic acid | 68 | 5.2 |
| 748 | S-20 | no | 235 | stearic acid | 66 | 4.9 |
| 749 | S-21 | no | 50 | behenic acid | 73 | 5.1 |
| 750 | S-22 | no | 150 | behenic acid | 72 | 5.0 |
| 751 | S-23 | no | 210 | behenic acid | 70 | 4.9 |
| 752 | S-24 | no | 235 | behenic acid | 72 | 4.8 |
| 753 | S-25 | no | 50 | oleic acid | 74 | 5.1 |
| 754 | S-26 | no | 70 | oleic acid | 70 | 5.0 |
| 755 | S-27 | no | 210 | oleic acid | 69 | 5.1 |
| 756 | S-28 | no | 235 | oleic acid | 70 | 4.9 |
| 757 | S-29 | no | 50 | undecylenic acid | 72 | 5.2 |
| 758 | S-30 | no | 100 | undecylenic acid | 70 | 5.2 |
| 759 | S-31 | no | 210 | undecylenic acid | 70 | 5.1 |
| 760 | S-32 | no | 235 | undecylenic acid | 72 | 5.0 |

Example 761: Production of Pigment Preparation T-1 (Not in Accordance with the Invention)

50 g of Pristerene 4910 were added to an aqueous suspension of pigment T as obtained after step b) of Example 20 and the mixture was stirred for 60 minutes. Aqueous potassium hydroxide solution was subsequently used to establish a pH of 5. Thereafter, the pigment preparation was isolated on a suction filter, washed and dried at 80° C. in a vacuum drying cabinet, and ground for approx. 2 minutes in a standard laboratory mill. (=pigment preparation T-1)

Examples 762 to 792: Production of Pigment Preparations T-2 to T-32 (Not in Accordance with the Invention and According to the Invention)

Analogously to Example 761, pigment preparations T-2 to T-32, according to the invention and not in accordance with the invention, were produced in Examples 762 to 792. Here, different aliphatic carboxylic acids B) or mixtures thereof in different amounts, as indicated in Table 21, were in each case added to an aqueous suspension of pigment T as obtained after step b) of Example 20.

Determination of the Dispersion Hardness and the Heat Resistance

For the pigment preparations T-1 to T-32, the dispersion hardness and the heat resistance were respectively determined in accordance with Methods 1 and 2 given below. The values can likewise be found in Table 21.

TABLE 21

| | | | Pigment preparations with pigment T | | | |
|---|---|---|---|---|---|---|
| Example | Pigment preparation | According to the invention | Grams of aliphatic carboxylic acid B) or mixture per mole of pigment | Aliphatic carboxylic acid B) or mixture | Dispersion hardness | Heat resistance at 300° C. (DE) |
| 761 | T-1 | no | 50 | Pristerene 4910 | 92 | 5.1 |
| 762 | T-2 | yes | 100 | Pristerene 4910 | 3 | 0.1 |
| 763 | T-3 | yes | 210 | Pristerene 4910 | 3 | 0.1 |
| 764 | T-4 | no | 235 | Pristerene 4910 | 8 | 4.9 |
| 765 | T-5 | no | 70 | caprylic acid | 90 | 5.1 |
| 766 | T-6 | no | 210 | caprylic acid | 89 | 5.0 |
| 767 | T-7 | no | 70 | nervonic acid | 92 | 5.0 |
| 768 | T-8 | no | 210 | nervonic acid | 91 | 5.0 |
| 769 | T-9 | no | 50 | myristic acid | 88 | 5.1 |
| 770 | T-10 | yes | 100 | myristic acid | 4 | 0.1 |
| 771 | T-11 | yes | 150 | myristic acid | 4 | 0.1 |
| 772 | T-12 | no | 235 | myristic acid | 15 | 4.9 |
| 773 | T-13 | no | 50 | palmitic acid | 90 | 5.0 |

TABLE 21-continued

Pigment preparations with pigment T

| Example | Pigment preparation | According to the invention | Grams of aliphatic carboxylic acid B) or mixture per mole of pigment | Aliphatic carboxylic acid B) or mixture | Dispersion hardness | Heat resistance at 300° C. (DE) |
|---|---|---|---|---|---|---|
| 774 | T-14 | yes | 150 | palmitic acid | 2 | 0.1 |
| 775 | T-15 | yes | 210 | palmitic acid | 2 | 0.2 |
| 776 | T-16 | no | 235 | palmitic acid | 9 | 4.9 |
| 777 | T-17 | no | 50 | stearic acid | 86 | 5.4 |
| 778 | T-18 | yes | 100 | stearic acid | 2 | 0.1 |
| 779 | T-19 | yes | 210 | stearic acid | 2 | 0.1 |
| 780 | T-20 | no | 235 | stearic acid | 8 | 4.8 |
| 781 | T-21 | no | 50 | behenic acid | 93 | 5.0 |
| 782 | T-22 | yes | 150 | behenic acid | 3 | 0.1 |
| 783 | T-23 | yes | 210 | behenic acid | 3 | 0.2 |
| 784 | T-24 | no | 235 | behenic acid | 9 | 4.9 |
| 785 | T-25 | no | 50 | oleic acid | 82 | 5.1 |
| 786 | T-26 | yes | 70 | oleic acid | 3 | 0.2 |
| 787 | T-27 | yes | 210 | oleic acid | 4 | 0.2 |
| 788 | T-28 | no | 235 | oleic acid | 10 | 4.8 |
| 789 | T-29 | no | 50 | undecylenic acid | 84 | 5.2 |
| 790 | T-30 | yes | 100 | undecylenic acid | 3 | 0.2 |
| 791 | T-31 | yes | 210 | undecylenic acid | 3 | 0.3 |
| 792 | T-32 | no | 235 | undecylenic acid | 11 | 5.1 |

Example 793: Production of Pigment Preparation U-1 (Not in Accordance with the Invention)

50 g of Pristerene 4910 were added to an aqueous suspension of pigment U as obtained after step b) of Example 21 and the mixture was stirred for 60 minutes. Aqueous potassium hydroxide solution was subsequently used to establish a pH of 5. Thereafter, the pigment preparation was isolated on a suction filter, washed and dried at 80° C. in a vacuum drying cabinet, and ground for approx. 2 minutes in a standard laboratory mill. (=pigment preparation U-1)

Examples 794 to 823: Production of Pigment Preparations U-2 to U-32 (Not in Accordance with the Invention and According to the Invention)

Analogously to Example 793, pigment preparations U-2 to U-32, according to the invention and not in accordance with the invention, were produced in Examples 794 to 823. Here, different aliphatic carboxylic acids B) or mixtures thereof in different amounts, as indicated in Table 22, were in each case added to an aqueous suspension of pigment U as obtained after step b) of Example 21.

Determination of the Dispersion Hardness and the Heat Resistance

For the pigment preparations U-1 to U-32, the dispersion hardness and the heat resistance were respectively determined in accordance with Methods 1 and 2 given below. The values can likewise be found in Table 22.

TABLE 22

Pigment preparations with pigment U

| Example | Pigment preparation | According to the invention | Grams of aliphatic carboxylic acid B) or mixture per mole of pigment | Aliphatic carboxylic acid B) or mixture | Dispersion hardness | Heat resistance at 300° C. (DE) |
|---|---|---|---|---|---|---|
| 793 | U-1 | no | 50 | Pristerene 4910 | 45 | 5.1 |
| 794 | U-2 | yes | 100 | Pristerene 4910 | 8 | 0.4 |
| 795 | U-3 | yes | 210 | Pristerene 4910 | 7 | 0.4 |
| 796 | U-4 | no | 235 | Pristerene 4910 | 11 | 4.7 |
| 797 | U-5 | no | 70 | caprylic acid | 50 | 5.1 |
| 798 | U-6 | no | 210 | caprylic acid | 48 | 5.1 |
| 799 | U-7 | no | 70 | nervonic acid | 52 | 5.1 |
| 800 | U-8 | no | 210 | nervonic acid | 50 | 5.5 |
| 801 | U-9 | no | 50 | myristic acid | 46 | 5.0 |
| 802 | U-10 | yes | 100 | myristic acid | 9 | 0.6 |
| 803 | U-11 | yes | 150 | myristic acid | 9 | 0.6 |
| 804 | U-12 | no | 235 | myristic acid | 12 | 4.9 |
| 805 | U-13 | no | 50 | palmitic acid | 48 | 5.0 |
| 806 | U-14 | yes | 150 | palmitic acid | 6 | 0.4 |
| 807 | U-15 | yes | 210 | palmitic acid | 6 | 0.4 |
| 808 | U-16 | no | 235 | palmitic acid | 12 | 4.9 |
| 809 | U-17 | no | 50 | stearic acid | 53 | 5.1 |
| 809 | U-18 | yes | 100 | stearic acid | 7 | 0.4 |
| 810 | U-19 | yes | 210 | stearic acid | 7 | 0.4 |
| 811 | U-20 | no | 235 | stearic acid | 15 | 4.8 |
| 812 | U-21 | no | 50 | behenic acid | 51 | 5.1 |

TABLE 22-continued

Pigment preparations with pigment U

| Example | Pigment preparation | According to the invention | Grams of aliphatic carboxylic acid B) or mixture per mole of pigment | Aliphatic carboxylic acid B) or mixture | Dispersion hardness | Heat resistance at 300° C. (DE) |
|---|---|---|---|---|---|---|
| 813 | U-22 | yes | 150 | behenic acid | 9 | 0.5 |
| 814 | U-23 | yes | 210 | behenic acid | 9 | 0.5 |
| 815 | U-24 | no | 235 | behenic acid | 13 | 4.9 |
| 816 | U-25 | no | 50 | oleic acid | 49 | 5.1 |
| 817 | U-26 | yes | 70 | oleic acid | 9 | 0.6 |
| 818 | U-27 | yes | 210 | oleic acid | 9 | 0.6 |
| 819 | U-28 | no | 235 | oleic acid | 13 | 4.9 |
| 820 | U-29 | no | 50 | undecylenic acid | 50 | 5.2 |
| 821 | U-30 | yes | 100 | undecylenic acid | 8 | 0.5 |
| 822 | U-31 | yes | 210 | undecylenic acid | 8 | 0.5 |
| 823 | U-32 | no | 235 | undecylenic acid | 12 | 5.1 |

List of Chemicals

| Fatty acid mixture | Typical composition in % by weight | | | |
|---|---|---|---|---|
| Commercial product (UNIQEMA) | $C_{14}$ | $C_{16}$ | $C_{18}$ | Melting range ° C. |
| Pristerene ® 4910 | 2 | 30 | 64 | 57.5-60 |
| Pristerene ® 4911 | 2 | 45 | 52 | 55-56 |
| Pristerene ® 9429 | | | | 52-60 |
| Pristerene ® 4922 | 0.7 | 30 | 66 | 51-55 |

| Fatty acid | CAS No. | Chain length $C_n=$ | Supplier |
|---|---|---|---|
| caprylic acid (octanoic acid, $C_8H_{16}O_2$) | 124-07-2 | 8 | Sigma-Aldrich |
| capric acid (n-decanoic acid, $C_{10}H_{20}O_2$) | 334-48-5 | 10 | Sigma-Aldrich |
| lauric acid (dodecanoic acid, $C_{12}H_{24}O_2$) | 143-07-7 | 12 | Sigma-Aldrich |
| myristic acid (tetradecanoic acid, $C_{14}H_{28}O_2$) | 544-63-8 | 14 | Sigma-Aldrich |
| palmitic acid (hexadecanoic acid, $C_{16}H_{32}O_2$) | 57-10-3 | 16 | Sigma-Aldrich |
| stearic acid (octadecanoic acid, $C_{18}H_{36}O_2$) | 57-11-4 | 18 | Sigma-Aldrich |
| behenic acid (n-docosanoic acid, $C_{22}H_{44}O_2$) | 112-85-6 | 22 | Sigma-Aldrich |
| lignoceric acid (tetracosanoic acid, $C_{24}H_{48}O_2$) | 557-59-5 | 24 | Sigma-Aldrich |
| oleic acid ((9Z)-octadec-9-enoic acid, $C_{18}H_{34}O_2$) | 112-80-1 | 18 | Alfa |
| undecylenic acid (undec-10-enoic acid, $C_{11}H_{20}O_2$) | 112-38-9 | 11 | Alfa |
| nervonic acid ((Z)-15-tetracosenoic acid, $C_{24}H_{46}O_2$) | 506-37-6 | 24 | Sigma-Aldrich |

The pigments prepared according to Examples 1 to 22 and the pigment preparations produced according to Examples 23 to 823 each underwent determination of the dispersion hardness according to Method 1 and of the heat stability according to Method 2.

Method 1: Determination of the Dispersion Hardness

The dispersion hardness was measured in accordance with DIN 53 775, part 7, with a cold rolling temperature of 25° C. and a hot rolling temperature of 150° C.

All dispersion hardnesses reported in this application were determined by this modified DIN method.

Samples having dispersion hardnesses of less than 20 are assessed as good.

Method 2: Determination of the Heat Stability

The heat stability is determined in accordance with DIN EN 12877-2.

To this end, samples of the pigment preparations were each mixed with the test medium polyamide 6 (Durethan B30S type with 1% titanium dioxide).

The samples thus produced were processed according to Method A of the standard in the injection-moulding process in each case at 240° with a residence time in the screw of 2.5 minutes and at 300° C. with a residence time in the screw of 5 minutes.

The colour distance (dE) between the samples produced at the lower test temperature and the samples produced at the higher test temperatures were determined from the injection mouldings thus produced by colorimetric evaluation in accordance with ISO 7724-2: 1984, 4.1.1, and ISO 7724-3.

Samples having dE values of less than or equal to 2 are considered to be heat-stable.

Conclusion

It is evident from the measured values in Tables 1 to 22 that only the pigment preparations according to the invention exhibit both low dispersion hardnesses (<20) and good heat stabilities (dE<2). It follows from this that the pigment preparations not in accordance with the invention are more poorly dispersible (i.e. more poorly processable in the plastic) and in addition exhibit much worse heat stability properties than the pigment preparations according to the invention.

What is claimed is:

1. A pigment preparation comprising:
   i) a metal azo pigment A) containing the components
      a) at least two metal azo compounds of the formula (I) which differ at least in the metal ion Me, or the tautomeric forms thereof,

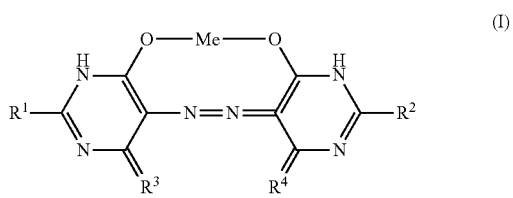

(I)

in which
   $R^1$ and $R^2$ are each independently OH, $NH_2$ or $NHR^5$, $R^3$ and $R^4$ are each independently =O or =NR$^5$,
$R^5$ is hydrogen or alkyl, and
Me is a metal ion Me$^1$ or Me$^2$,
wherein
Me$^1$ is Cu$^{2+}$ or Ni$^{2+}$ and Me$^2$ is Zn$^{2+}$, Al$^{3+}{}_{2/3}$, Fe$^{2+}$, Fe$^{3+}{}_{2/3}$, Co$^{2+}$, Co$^{3+}{}_{2/3}$, La$^{3+}{}_{2/3}$, Ce$^{3+}{}_{2/3}$, Pr$^{3+}{}_{2/3}$, Nd$^{2+}$, Nd$^{3+}{}_{2/3}$, Sm$^{2+}$, Sm$^{3+}{}_{2/3}$, Eu$^{2+}$, Eu$^{3+}{}_{2/3}$, Gd$^{3+}{}_{2/3}$, Tb$^{3+}{}_{2/3}$, Dy$^{3+}{}_{2/3}$, Ho$^{3+}{}_{2/3}$, Yb$^{2+}$, Yb$^{3+}{}_{2/3}$, Er$^{3+}{}_{2/3}$, Tm$^{3+}{}_{2/3}$, Mg$^{2+}$, Ca$^{2+}$, Sr$^{2+}$, Mn$^{2+}$, Y$^{3+}{}_{2/3}$, Sc$^{3+}{}_{2/3}$, Ti$^{2+}$, Ti$^{3+}{}_{2/3}$, Nb$^{3+}{}_{2/3}$, Mo$^{2+}$, Mo$^{3+}{}_{2/3}$, V$^{2+}$, V$^{3+}{}_{2/3}$, Zr$^{2+}$, Zr$^{3+}{}_{2/3}$, Cd$^{2+}$, Cr$^{3+}{}_{2/3}$, Pb$^{2+}$ or Ba$^{2+}$,
with the proviso that the amount of metal ions Me$^1$ in total is 97 to 100 mol % and the amount of metal ions selected from the series Me$^2$ in total is 0 to 3 mol %, based in each case on one mole of all compounds of the formula (I),
and
wherein the molar ratio of Cu to Ni metal ions in the sum total of the compounds of the formula (I) is 99.9:0.1 to 0.1:99.9,
and
b) at least one compound of the formula (II)

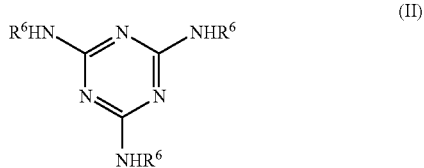

(II)

in which
$R^6$ is hydrogen or alkyl,
or a metal azo pigment A) prepared by reacting component a) with component b),
and
ii) at least one aliphatic monocarboxylic acid B) having 10 to 22 carbon atoms in an amount of from 70 to 210 g based on 1 mol of all metal azo compounds (I) present in the metal azo pigment A).

2. The pigment preparation according to claim 1, wherein the metal azo pigment A) contains adducts of the components a) and b).

3. The pigment preparation according to claim 1, wherein
$R^1$ and $R^2$ are OH,
$R^3$ and $R^4$ are =O,
Me$^1$ is Cu$^{2+}$ or Ni$^{2+}$ and
Me$^2$ is Zn$^{2+}$, Al$^{3+}{}_{2/3}$, Fe$^{2+}$, Fe$^{3+}{}_{2/3}$, Co$^{2+}$, Co$^{3+}{}_{2/3}$, La$^{3+}{}_{2/3}$, Ce$^{3+}{}_{2/3}$, Pr$^{3+}{}_{2/3}$, Nd$^{2+}$, Nd$^{3+}{}_{2/3}$, Sm$^{2+}$, Sm$^{3+}{}_{2/3}$, Eu$^{2+}$, Eu$^{3+}{}_{2/3}$, Gd$^{3+}{}_{2/3}$, Tb$^{3+}{}_{2/3}$, Dy$^{3+}{}_{2/3}$,
with the proviso that the amount of metal ions Me$^1$ in total is 99 to 100 mol % and the amount of metal ions Me$^2$ in total is 0 to 1 mol %, based in each case on one mole of all compounds of the formula (I), and
wherein the molar ratio of Cu to Ni metal ions in the sum total of the compounds of the formula (I) is 0.5:99.5 to 10:90,
and
$R^6$ is hydrogen.

4. The pigment preparation according to claim 1, wherein
$R^1$ and $R^2$ are OH,
$R^3$ and $R^4$ are =O,
Me$^1$ is Cu$^{2+}$ or Ni$^{2+}$ and
Me$^2$ is Zn$^{2+}$, Al$^{3+}{}_{2/3}$, Fe$^{2+}$, Fe$^{3+}{}_{2/3}$, Co$^{2+}$, Co$^{3+}{}_{2/3}$,
with the proviso that the amount of metal ions Me$^1$ in total is 99 to 100 mol % and the amount of metal ions Me$^2$ in total is 0 to 1 mol %, based in each case on one mole of all compounds of the formula (I),
the molar ratio of Cu to Ni metal ions in the sum total of the compounds of the formula (I) is 1:99 to 5:95,
and
$R^6$ is hydrogen.

5. The pigment preparation according to claim 1, wherein
$R^1$ and $R^2$ are OH,
$R^3$ and $R^4$ are =O and
Me is a metal ion Me$^1$,
with the proviso that the amount of metal ions Me$^1$ in total is 100 mol %, based on one mole of all compounds of the formula (I), and
the molar ratio of Cu to Ni metal ions in the sum total of the compounds of the formula (I) is 1:99 to 5:95,
and
$R^6$ is hydrogen.

6. The pigment preparation according to claim 1, wherein the metal azo pigment A) has a BET specific surface area (m$^2$/g) of 50 to 200 m$^2$/g, determined in accordance with DIN 66131.

7. The pigment preparation according to claim 1, wherein the at least one aliphatic monocarboxylic acid B) is saturated or mono- or polyunsaturated.

8. The pigment preparation according to claim 1, wherein the at least one aliphatic monocarboxylic acid B) is saturated or mono- to triunsaturated.

9. The pigment preparation according to claim 1, wherein the at least one aliphatic monocarboxylic acid B) is saturated or mono- or diunsaturated.

10. The pigment preparation according to claim 1, wherein the at least one aliphatic monocarboxylic acid B) contains 14 to 18 carbon atoms and is saturated or monounsaturated.

11. The pigment preparation according to claim 10, wherein the preparation contains tetradecanoic acid (myristic acid), hexadecanoic acid (palmitic acid) and/or octadecanoic acid (stearic acid).

12. The pigment preparation according to claim 1, wherein the at least one aliphatic monocarboxylic acid B) is a mixture of aliphatic monocarboxylic acids containing 0.5% to 5% by weight of at least one saturated or monounsaturated aliphatic monocarboxylic acid having 14 carbon atoms, 25% to 60% by weight of at least one saturated or monounsaturated aliphatic monocarboxylic acid having 16 carbon atoms and 40% to 75% by weight of at least one saturated or monounsaturated aliphatic monocarboxylic acid having 18 carbon atoms.

13. The pigment preparation according to claim 1, wherein the preparation contains from 100 to 180 g of the at least one aliphatic monocarboxylic acid B), based on one mole of all metal azo compounds (I) present in the metal azo pigment A).

14. The pigment preparation according to claim 1, wherein $R^5$ is hydrogen or $C_1$-$C_4$-alkyl.

15. The pigment preparation according to claim 1, wherein $R^6$ is hydrogen or $C_1$-$C_4$-alkyl optionally mono- or polysubstituted by OH.

16. The pigment preparation according to claim 6, wherein the metal azo pigment A) has a BET specific surface area (m$^2$/g) of 80 to 160 m$^2$/g, determined in accordance with DIN 66131.

17. A process for producing the pigment preparation according to claim 1, comprising mixing the at least one metal azo pigment A) with the at least one aliphatic monocarboxylic acid B), optionally with one or more auxiliaries and/or additives.

* * * * *